United States Patent
Abe et al.

(10) Patent No.: US 10,514,703 B2
(45) Date of Patent: Dec. 24, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masaaki Abe, Wako (JP); Kunimichi Hatano, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 15/602,265

(22) Filed: May 23, 2017

(65) Prior Publication Data

US 2017/0336797 A1 Nov. 23, 2017

(30) Foreign Application Priority Data

May 23, 2016 (JP) ................................. 2016-102429

(51) Int. Cl.
*G05D 1/02* (2006.01)
*G06K 9/00* (2006.01)
(Continued)

(52) U.S. Cl.
CPC ............ *G05D 1/0246* (2013.01); *B60R 1/00* (2013.01); *G02B 27/0093* (2013.01);
(Continued)

(58) Field of Classification Search
None
See application file for complete search history.

(56) References Cited

U.S. PATENT DOCUMENTS 5,583,795 A * 12/1996 Smyth .................. A61B 3/0025
 359/630
6,611,384 B1 * 8/2003 Biverot .................. G02B 27/01
 345/7
(Continued)

FOREIGN PATENT DOCUMENTS

CN 104620076 A 5/2015
JP 2008-213649 A 9/2008
(Continued)

OTHER PUBLICATIONS

Office Action dated Mar. 13, 2018, issued in counterpart Japanese Application No. 2016-102429, with English machine translation. (6 pages).
(Continued)

*Primary Examiner* — Richard M Camby
(74) *Attorney, Agent, or Firm* — Westerman, Hattori, Daniels & Adrian, LLP

(57) ABSTRACT

A vehicle control system includes an imaging section, a surroundings monitoring section, and a display controller. The imaging section is configured to capture an image of surroundings of a vehicle. The surroundings monitoring section is configured to monitor conditions surrounding the vehicle. The display controller is configured to display, on a display present within a cabin of the vehicle and configured to display an image based on an operation by an occupant, an image of surroundings of the vehicle superimposed over part of an image based on an operation by the occupant, and to enlarge the image of the surroundings of the vehicle based on a monitoring result from the surroundings monitoring section.

12 Claims, 19 Drawing Sheets

(51) Int. Cl.
B60R 1/00 (2006.01)
G02B 27/00 (2006.01)
G02B 27/01 (2006.01)

(52) U.S. Cl.
CPC ..... *G02B 27/0101* (2013.01); *G02B 27/0179* (2013.01); *G05D 1/0212* (2013.01); *G05D 1/0214* (2013.01); *G05D 1/0223* (2013.01); *G06K 9/00335* (2013.01); *G06K 9/00791* (2013.01); *B60R 2300/306* (2013.01); *B60R 2300/802* (2013.01); *B60R 2300/8046* (2013.01); *G02B 2027/014* (2013.01); *G02B 2027/0138* (2013.01); *G02B 2027/0141* (2013.01); *G02B 2027/0187* (2013.01); *G05D 2201/0213* (2013.01); *G06K 9/00832* (2013.01)

(56) References Cited

U.S. PATENT DOCUMENTS

| | | | | |
|---|---|---|---|---|
| 8,633,811 B2* | 1/2014 | Ikeda | ................. | B60Q 9/005 |
| | | | | 340/441 |
| 8,793,053 B2* | 7/2014 | Ikeda | ................. | B60R 1/00 |
| | | | | 348/148 |
| 10,124,728 B2* | 11/2018 | Fujio | ................. | H04N 7/183 |
| 2005/0154505 A1* | 7/2005 | Nakamura | ........... | G01C 21/365 |
| | | | | 701/1 |
| 2010/0128128 A1 | 5/2010 | Nagamine et al. | | |

FOREIGN PATENT DOCUMENTS

| | | |
|---|---|---|
| JP | 2010-128794 A | 6/2010 |
| JP | 2014-191668 A | 10/2014 |
| JP | 2015-230641 A | 12/2015 |
| WO | 2011-158347 A1 | 12/2011 |

OTHER PUBLICATIONS

Office Action dated Jul. 30, 2019, issued in counterpart CN Application No. 201710308092.3, with English translation (13 pages).
Search Report dated Jul. 17, 2019, issued in counterpart CN Application No. 201710308092.3 (2 pages).

* cited by examiner

| DRIVING MODE<br>NON-DRIVING<br>OPERATION SYSTEM | MANUAL<br>DRIVING<br>MODE | AUTOMATED DRIVING MODE | | | ... |
|---|---|---|---|---|---|
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

188

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-102429, filed May 23, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

Recently, research is progressing into technology for automatically controlling at least one out of acceleration/deceleration or steering of a vehicle such that the vehicle travels along a route to a destination (referred to as "automated driving" hereafter). In such automated driving, a suitable action plan is generated in accordance with conditions surrounding the vehicle so as to enable the vehicle to travel safely to its destination. It is also possible for a driver to perform desired actions other than driving, such as an operation on a navigation device, while automated driving is being executed (for example, see International Publication No. 2011-158347).

In cases in which a situation requiring attention has arisen in the surroundings of the vehicle while automated driving is being executed, it is desirable for a vehicle occupant to be promptly informed of this situation.

SUMMARY

The present disclosure describes, for example, a vehicle control system, a vehicle control method, and a vehicle control program capable of more quickly relating information to a vehicle occupant.

A first aspect of the present disclosure describes a vehicle control system including an imaging section, a surroundings monitoring section, and a display controller. The imaging section is configured to capture an image of surroundings of a vehicle. The surroundings monitoring section is configured to monitor conditions surrounding the vehicle. The display controller is configured to display, on a display present within a cabin of the vehicle and configured to display an image based on an operation by an occupant, an image of surroundings of the vehicle superimposed over part of an image based on an operation by the occupant, and to enlarge the image of the surroundings of the vehicle based on a monitoring result from the surroundings monitoring section.

A second aspect of the present disclosure describes a vehicle control system including an imaging section, a surroundings monitoring section, and a display controller. The imaging section is configured to capture an image of surroundings of a vehicle. The surroundings monitoring section is configured to monitor conditions surrounding the vehicle. The display controller is configured to display, on a display configured to display an image overlaid onto a mirror provided to the vehicle, an image of surroundings of the vehicle based on a monitoring result from the surroundings monitoring section.

A third aspect of the present disclosure is the vehicle control system of the first aspect, wherein the display is a portable display.

A fourth aspect of the present disclosure is the vehicle control system of any one of the first aspect to the third aspect, further including a detection section configured to detect a gaze of an occupant of the vehicle. In the fourth aspect, the display controller displays an image of surroundings of the vehicle on the display present in a direction corresponding to the gaze of the occupant of the vehicle detected by the detection section.

A fifth aspect of the present disclosure is the vehicle control system of the fourth aspect, wherein when there are plural of the displays present in the direction corresponding to the gaze of the occupant detected by the detection section, the display controller displays the image of the surroundings on each of the plural displays.

A sixth aspect of the present disclosure is the vehicle control system of any one of the first aspect to the fifth aspect, further including an automated driving controller configured to execute automated driving in which at least one of speed control or steering control of the vehicle is performed automatically based on a monitoring result from the surroundings monitoring section. In the sixth aspect, the display controller displays, on the display, information indicating conditions surrounding the vehicle based on a monitoring result from the surroundings monitoring section while the automated driving is being executed by the automated driving controller.

A seventh aspect of the present disclosure is a vehicle control method. The method includes capturing an image of surroundings of a vehicle; monitoring conditions surrounding the vehicle; and displaying, on a display present within a cabin of the vehicle and configured to display an image based on an operation by an occupant, an image of surroundings of the vehicle superimposed over part of an image based on an operation by the occupant, and enlarging the image of the surroundings of the vehicle based on a monitoring result of the conditions surrounding the vehicle.

An eighth aspect of the present disclosure is a vehicle control method. The method includes capturing an image of surroundings of a vehicle; monitoring conditions surrounding the vehicle; and displaying, on a display configured to display an image overlaid onto a mirror provided to the vehicle, an image of surroundings of the vehicle based on a monitoring result of the conditions surrounding the vehicle.

A ninth aspect of the present disclosure is a vehicle control program for causing an on-board computer to execute processing. The processing includes processing to capture an image of surroundings of a vehicle; processing to monitor conditions surrounding the vehicle; and processing to display, on a display present within a cabin of the vehicle and configured to display an image based on an operation by an occupant, an image of surroundings of the vehicle superimposed over part of an image based on an operation by the occupant, and to enlarge the image of the surroundings of the vehicle based on a monitoring result of the conditions surrounding the vehicle.

A tenth aspect of the present disclosure is a vehicle control program for causing an on-board computer to execute processing. The processing includes processing to capture an image of surroundings of a vehicle; processing to monitor conditions surrounding the vehicle; and processing to display, on a display configured to display an image overlaid onto a mirror provided to the vehicle, an image of surroundings of the vehicle based on a monitoring result of the conditions surrounding the vehicle.

According to the first, third, seventh, and ninth aspects of the present disclosure, for example, an image of surroundings of the vehicle is displayed, on a display configured to display an image based on an operation by an occupant, superimposed over part of an image based on an operation by the occupant. The image of the surroundings of the vehicle is enlarged based on a monitoring result of conditions surrounding the vehicle. Thus, by looking at the display, the occupant is able to quickly check an image indicating both that a situation requiring attention has arisen in the surroundings of the vehicle and the situation requiring attention.

According to the second, eighth, and tenth aspects of the present disclosure, for example, an image of surroundings of a vehicle is displayed, on a display configured to display an image overlaid onto a mirror provided to the vehicle, based on a monitoring result of the conditions surrounding the vehicle. Thus, by looking at the display, the occupant is able to quickly check an image indicating both that a situation requiring attention has arisen in the surroundings of the vehicle and the situation requiring attention.

According to the fourth and fifth aspects of the present disclosure, for example, the display controller displays an image of surroundings of the vehicle on a display present a direction corresponding to the gaze of the occupant of the vehicle detected by the detection section. An image of surroundings for which attention is required can thereby be displayed on a display that the occupant may be looking at. Thus, by looking at the display, the occupant is able to reliably and quickly check an image indicating both that a situation requiring attention has arisen in the surroundings of the vehicle and the situation requiring attention.

According to the sixth aspect of the present disclosure, for example, automated driving is executed in which at least one of speed control or steering control of the vehicle is performed automatically based on a monitoring result of the conditions surrounding the vehicle, and information indicating conditions surrounding the vehicle is displayed on the display based on the monitoring result. Thus, by looking at the display, the occupant is able to quickly check an image indicating both that a situation requiring attention has arisen in the surroundings of the vehicle and the situation requiring attention. The occupant is also able to confirm that automated driving is being appropriately executed.

BRIEF DESCRIPTION OF THE DRAWINGS

The advantages of the disclosure will become apparent in the following description taken in conjunction with the following drawings.

DETAILED DESCRIPTION

Explanation follows regarding an embodiment of a vehicle control system, a vehicle control method, and a vehicle control program of the present disclosure, with reference to the drawings.

Common Configuration

Figure 1:
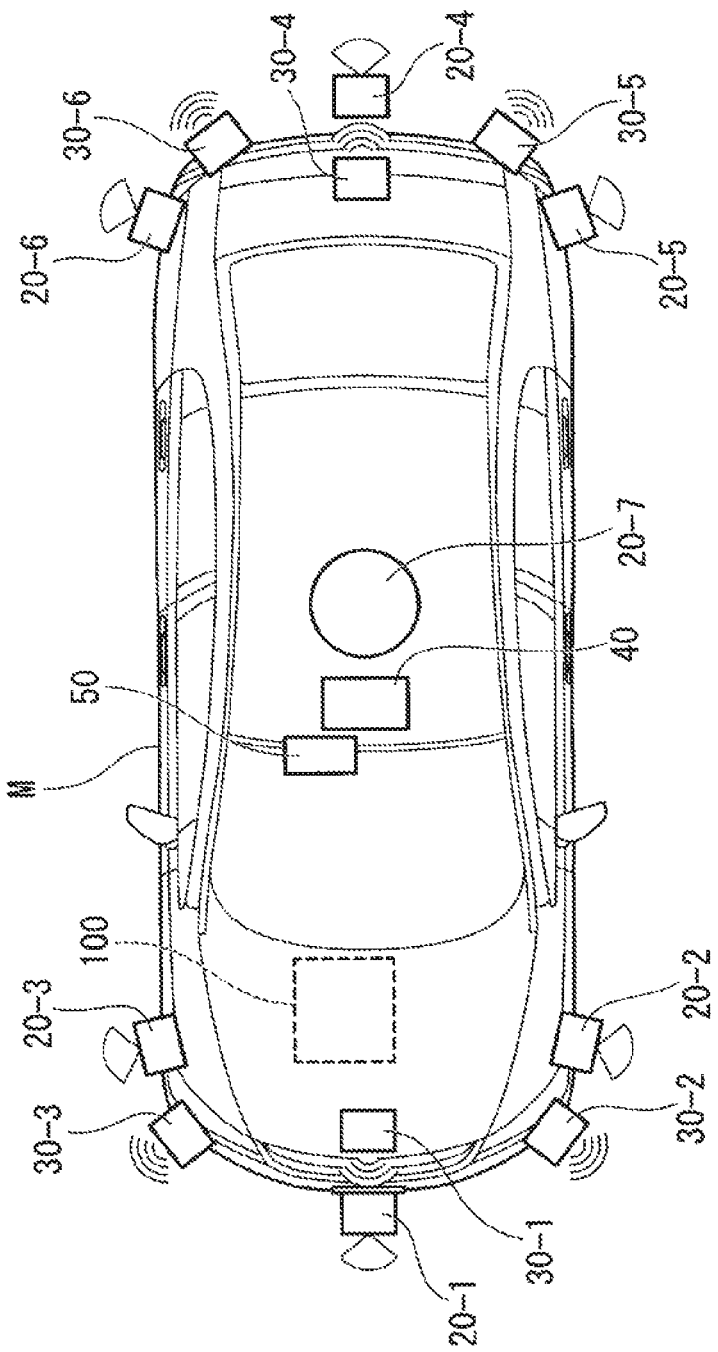
FIG. 1 is a diagram illustrating configuration elements of a vehicle of one embodiment.

FIG. 1 is a diagram illustrating configuration elements of a vehicle (referred to as the vehicle M hereafter) installed with a vehicle control system 100 of the respective embodiments. The vehicle installed with the vehicle control system 100 is, for example, a two-wheeled, three-wheeled, or four-wheeled automobile, and this encompasses automobiles having an internal combustion engine such as a diesel engine or gasoline engine as a power source, electric automobiles having an electric motor as a power source, and hybrid automobiles having both an internal combustion engine and an electric motor. Electric automobiles are, for example, driven using electric power discharged from a battery such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40 (imaging section); a navigation device 50; and the vehicle control system 100 are installed to the vehicle M.

The finders 20-1 to 20-7 are, for example, LIDARs (Light Detection and Ranging, or Laser Imaging Detection and Ranging) that measure the scattering of emitted light and measure the distance to a target. For example, the finder 20-1 is attached to a front grille or the like, and the finder 20-2 and the finder 20-3 are attached to a side face of a vehicle body, a side-view mirror, a front headlamp interior, the vicinity of a side lamp, or the like. The finder 20-4 is attached to a trunk lid or the like, the finder 20-5 and the finder 20-6 are attached to a side face of the vehicle body, a tail light interior, or the like. The finders 20-1 to 20-6 described above have detection regions of, for example, approximately 150° in a horizontal direction. The finder 20-7 is attached to a roof or the like. The finder 20-7 has a detection region of, for example, 360° in the horizontal direction.

The radar 30-1 and the radar 30-4 are, for example, long-range millimeter wave radars having a wider detection region in a depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred to as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or a complementary metal oxide semiconductor (CMOS) element. The camera 40 is, for example, attached to the roof or the like. The camera 40 may include plural cameras that, for example, periodically and repeatedly image the surroundings of the vehicle M (in front, to the rear, to the left, and to the right). For example, the camera 40 may separately include a forward-facing camera that is attached to the front grille or the like and that images an area in front of the vehicle M, a rear-facing camera that is attached to a trunk lid or the like and that images an area behind the vehicle M, and a left camera and a right camera that are each attached to a side face or the like of the vehicle body and that respectively image an area to the left and an area to the right of the vehicle M. The camera 40 may also be a stereo camera capable of measuring distance components using plural cameras.

Note that the configuration illustrated in FIG. 1 is merely an example; a portion of the configuration may be omitted, and other configuration may be further added.

First Embodiment

Figure 2:
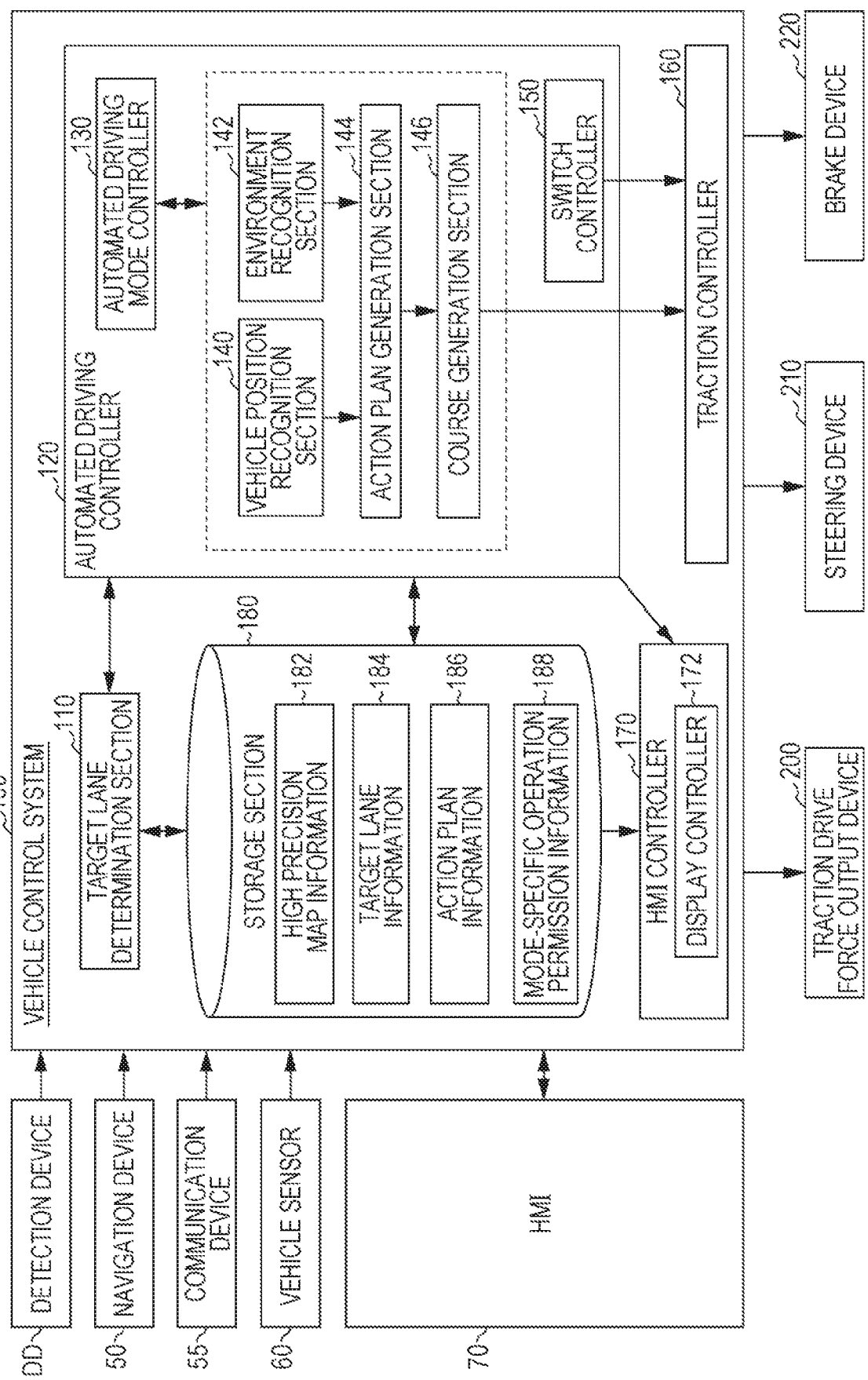
FIG. 2 is a functional configuration diagram of a vehicle in a first exemplary embodiment.

FIG. 2 is a functional configuration diagram focusing on the vehicle control system 100 according to the first embodiment. Detection devices DD that include the finders 20, the radars 30, the camera 40, and the like; the navigation device 50; a communication device 55; vehicle sensors 60; a human machine interface (HMI) 70; the vehicle control system 100; a traction drive force output device 200; a steering device 210; and a brake device 220 are installed in the vehicle M. These devices and apparatuses are connected to one another by a multiplex communication line such as a controller area network (CAN) communication line, or by a wireless communication network, a serial communication line, or the like. Note that the vehicle control system within the scope of the claims does not indicate only the "vehicle control system 100" and may include configuration other than that of the vehicle control system 100 (such as the detection devices DD and a HMI 70).

The navigation device 50 includes a global navigation satellite system (GNSS) receiver, map information (a navigation map), a touch panel display device that functions as a user interface, a speaker, a microphone, and the like. The navigation device 50 identifies the position of the vehicle M using the GNSS receiver and derives a route from this position to a destination designated by a user. The route derived by the navigation device 50 is provided to a target lane determination section 110 of the vehicle control system 100. The position of the vehicle M may be identified or complemented by an inertial navigation system (INS) employing output from the vehicle sensors 60. When the vehicle control system 100 is executing a manual driving mode, the navigation device 50 provides guidance along a route to the destination using audio and a navigation display. Note that configuration for identifying the position of the vehicle M may be provided independently from the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55, for example, performs wireless communication using a cellular network, a Wi-Fi network, BLUETOOTH (registered trademark), dedicated short range communication (DSRC), or the like.

The vehicle sensors 60 include, for example, a vehicle speed sensor that detects vehicle speed, an acceleration sensor that detects acceleration, a yaw rate sensor that detects angular velocity about a vertical axis, and a directional sensor that detects the heading of the vehicle M.

Figure 3:
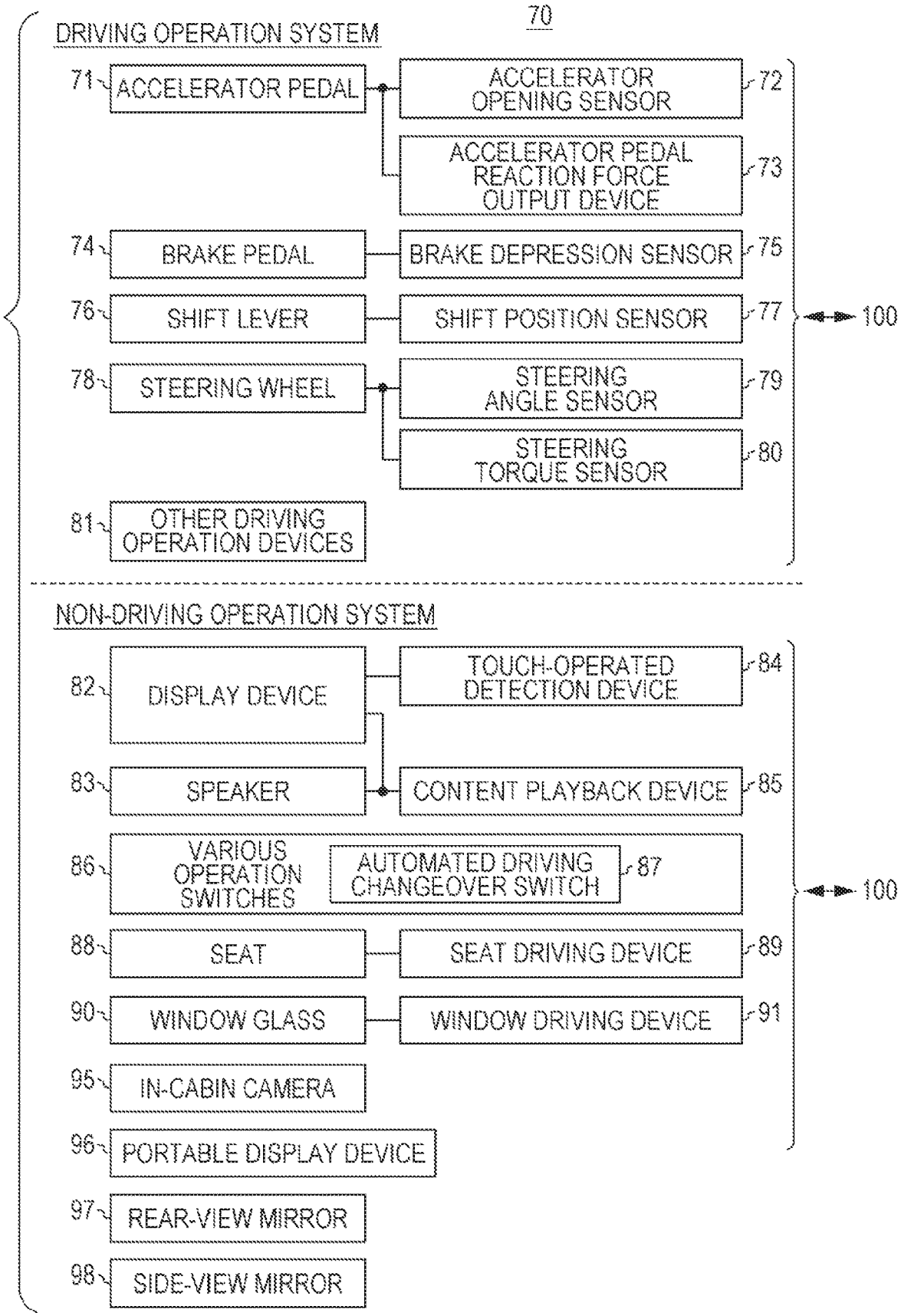
FIG. 3 is a configuration diagram of a HMI in the first exemplary embodiment.

FIG. 3 is a configuration diagram of the HMI 70. The HMI 70 is provided with, for example, driving operation system configuration and non-driving operation system configuration. There is no clear boundary between the two, and driving operation system configuration may provide non-driving operation system functionality (or vise-versa).

As configuration of the driving operation system, the HMI 70 includes, for example, an accelerator pedal 71, an accelerator opening sensor 72 and an accelerator pedal reaction force output device 73, a brake pedal 74 and a brake depression sensor (or a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions from a vehicle occupant (or deceleration instructions due to return-operation). The accelerator opening sensor 72 detects a depression amount of the accelerator pedal 71, and outputs an accelerator opening signal indicating the depression amount to the vehicle control system 100. Note that output may be made directly to the traction drive force output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) in the opposite direction to the operation direction of the accelerator pedal 71, according to instructions from the vehicle control system 100.

The brake pedal 74 is an operation element for receiving deceleration instructions from the vehicle occupant. The brake depression sensor 75 detects a depression amount of (alternatively, the pressing force on) the brake pedal 74 and outputs a brake signal indicating the detection result to the vehicle control system 100.

The shift lever 76 is an operation element for receiving shift level change instructions from the vehicle occupant. The shift position sensor 77 detects the shift level instructed by the vehicle occupant and outputs a shift position signal indicating the detection result to the vehicle control system 100.

The steering wheel 78 is an operation element for receiving turning instructions from the vehicle occupant. The steering angle sensor 79 detects the steering angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100.

The other driving operation devices 81 are, for example, a joystick, a button, a dial switch, a graphic user interface (GUI) switch, and the like. The other driving operation devices 81 receive acceleration instructions, deceleration instructions, turning instructions, and the like and output the instructions to the vehicle control system 100.

As configuration of the non-driving operation system, the HMI 70 includes, for example, a display device 82, a speaker 83, a touch-operated detection device 84 and a content playback device 85, various operation switches 86, a seat 88 and a seat driving device 89, window glass 90 and a window driving device 91, an in-cabin camera 95, a portable display device 96, a rear-view mirror 97, and side-view mirrors 98.

The display device (display) 82 is, for example, a liquid crystal display (LCD), an organic electroluminescent (EL) display device, or the like attached to a respective section of an instrument panel, at a freely selected location facing the front passenger seat and rear seat, or the like. Moreover, the display device 82 may be a head-up display (HUD) that projects an image onto the front windshield or another window. The speaker 83 outputs audio. In cases in which the display device 82 is a touch panel, the touch-operated detection device 84 detects contact positions (touched positions) on the display screen of the display device 82 and outputs the contact positions to the vehicle control system 100. Note that in cases in which the display device 82 is not a touch panel, the touch-operated detection device 84 may be omitted.

The portable display device or mobile display device (display) 96 is a portable display device that can be brought into the cabin of the vehicle M. The portable display device 96 encompasses, for example, smartphones, tablet terminals, virtual reality (VR) glasses, and the like. The portable display device 96 is able to perform wireless communication with the vehicle control system 100 over BLUETOOTH (registered trademark) or the like. The vehicle control system 100 can thereby remotely control the portable display device 96.

The content playback device 85 includes, for example, a digital versatile disc (DVD) playback device, a compact disc (CD) playback device, a television receiver, various guidance image generation devices, and the like. Some or all out of the display device 82, the speaker 83, the touch-operated detection device 84, and the content playback device 85 may be configured so as to be shared with the navigation device 50.

The various operation switches 86 are disposed at freely selected locations inside the vehicle cabin. The various operation switches 86 include an automated driving change-over switch 87 for instructing automated driving to start (or to start in the future) or stop. The automated driving change-over switch 87 may be a graphical user interface (GUI) switch or a mechanical switch. Moreover, the various operation switches 86 may include a switch for driving the seat driving device 89 or window driving device 91.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 95 is a digital camera that employs a solid state imaging element such as a CCD or a CMOS element. The in-cabin camera 95 is attached to a position from which at least the head of the vehicle occupant performing driving operation, and the gaze of the vehicle occupant, can be imaged, such as the rear-view mirror, steering wheel boss section, or instrument panel. The in-cabin camera 95, for example, images the vehicle occupant periodically and repeatedly.

The rear-view mirror 97 is attached to the inside of the cabin of the vehicle M, and is a mirror that enables the viewing of behind the vehicle M, as seen by a vehicle occupant seated in a driving seat (a seat provided with a steering wheel or the like). The rear-view mirror 97 may include a display for displaying a desired image on part of a mirror surface of the rear-view mirror 97. The display may, for example, be a device that performs display processing using projection, holograms, or the like, and may be a liquid crystal or organic EL display that turns transparent when not performing display. The rear-view mirror 97 may also be a display device in which the "mirror" itself is an electronic display. In such a case, the rear-view mirror 97 may electrically display a rearward image, as seen by a vehicle occupant seated in the driving seat.

The side-view mirrors 98 are attached to the doors or the like of the vehicle M, and are mirrors that allow viewing of areas to the sides of the vehicle M, as seen by a vehicle occupant seated in a driving seat. The side-view mirrors 98 include a left side-view mirror that is attached to a left side portion of the vehicle M, and a right side-view mirror that is attached to a right side portion of the vehicle M. The side-view mirrors 98 may also include a display for displaying a desired image on part of a mirror surface of the respective side-view mirror 98. The displays may, for example, be devices that perform display processing using projection, holograms, or the like, and may be liquid crystal or organic EL displays that turn transparent when not performing display. The side-view mirrors 98 may also be display devices in which each "mirror" itself is an electronic display. In such a case, the side-view mirrors 98 may electrically display a respective image of an area to the side as seen by a vehicle occupant seated in the driving seat.

Prior to explaining the vehicle control system 100, explanation follows regarding the traction drive force output device 200, the steering device 210, and the brake device 220.

The traction drive force output device 200 outputs traction drive force (torque) for causing the vehicle to travel to drive wheels. In cases in which the vehicle M is an automobile that has an internal combustion engine as the power source, the traction drive force output device 200 includes, for example, an engine, a transmission, and an engine electronic control unit (ECU) that controls the engine. In cases in which the vehicle M is an electric automobile that has an electric motor as the power source, the traction drive force output device 200 includes, for example, a traction motor and a motor ECU that controls the traction motor. In cases in which the vehicle M is a hybrid automobile, the traction drive force output device 200 includes, for example, an engine, a transmission, and an engine ECU; and a traction motor and a motor ECU. In cases in which the traction drive force output device 200 includes only an engine, the engine ECU adjusts the engine throttle opening, the shift level, or the like, in accordance with information input from a traction controller 160, described later. In cases in which the traction drive force output device 200 includes only a traction motor, the motor ECU adjusts a duty ratio of a PWM signal applied to the traction motor, in accordance with information input from the traction controller 160. In cases in which the traction drive force output device 200 includes an engine and a traction motor, the engine ECU and the motor ECU cooperatively control traction drive force, in accordance with information input from the traction controller 160.

The steering device 210 includes, for example, a steering ECU and an electric motor. The electric motor, for example, exerts force in a rack-and-pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the traction controller 160, such that braking torque is output to each wheel in accordance with the braking operation. The electric servo brake device may include a mechanism that transmits hydraulic pressure generated due to operation of the brake pedal to the cylinder via a master cylinder as a backup. Note that the brake device 220 is not limited to the electric servo brake device explained above and may be an electronically controlled hydraulic brake device. The electronically controlled hydraulic brake device controls an actuator in accordance with information input from the traction controller 160 and transmits hydraulic pressure of a master cylinder to the cylinder. The brake device 220 may also include a regenerative brake that uses a traction motor which might be included in the traction drive force output device 200.

Vehicle Control System

Explanation follows regarding the vehicle control system 100. The vehicle control system 100 is, for example, implemented by one or more processors, or by hardware having equivalent functionality. The vehicle control system 100 may be configured by a combination of a processor such as a central processing unit (CPU), a storage device, and an ECU (electronic control unit) in which a communication interface is connected by an internal bus, or a microprocessing unit (MPU) or the like.

Returning to FIG. 2, the vehicle control system 100 includes, for example, the target lane determination section 110, an automated driving controller 120, the traction controller 160, and the storage section 180. The automated driving controller 120 includes, for example, an automated driving mode controller 130, a vehicle position recognition section 140, an environment recognition section (surroundings monitoring section) 142, an action plan generation section 144, a course generation section 146, and a switch controller 150. The automated driving controller 120 automatically performs at least one out of speed control or steering control of the vehicle M. Some or all out of the target lane determination section 110, the respective sections of the automated driving controller 120, and the traction controller 160 are implemented by the processor executing a program (software). Moreover, of these, some or all may be implemented by hardware such as a large scale integration (LSI) or an application specific integrated circuit (ASIC), or may be implemented by a combination of software and hardware.

The storage section 180 stores information such as high precision map information 182, target lane information 184, action plan information 186, and mode-specific operation permission information 188. The storage section 180 is implemented by read only memory (ROM) or random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, the vehicle control system 100 may be configured distributed across plural computer devices.

The target lane determination section 110 is, for example, implemented by an MPU. The target lane determination section 110 divides the route provided from the navigation device 50 into plural blocks (for example, divides the route every 100 m along the direction of progress of the vehicle), and references the high precision map information 182 to determine the target lane for each block. The target lane determination section 110, for example, determines which lane number from the left to travel in. In cases in which a junction point, a merge point, or the like is present in the route, the target lane determination section 110, for example, determines the target lanes so as to enable the vehicle M to travel along a sensible travel route for advancing beyond the junction. The target lanes determined by the target lane determination section 110 are stored in the storage section 180 as the target lane information 184.

The high precision map information 182 is map information with higher precision than the navigation map of the navigation device 50. The high precision map information 182 includes, for example, lane-center information, lane-boundary information, or the like. The high precision map information 182 may also include, for example, road information, traffic restriction information, address information (address, postal code), facilities information, phone number information, and the like. The road information includes information such as information indicating whether the type of road is an expressway, a toll road, a national highway, or a prefectural road; the number of lanes in the road; the width of each lane; the gradient of the road; the position of the road (three dimensional coordinates including a longitude, a latitude, and an altitude); the curvature of the lanes; the position of lane merge and junction points; and signage provided on the road. The traffic restriction information includes information regarding lane closures due to road work, traffic accidents, congestion, and the like.

The automated driving mode controller 130 determines the automated driving mode to be implemented by the automated driving controller 120. The automated driving mode in the present embodiment includes the following modes. Note that the following modes are merely examples, and the number of modes of the automated driving may be freely determined.

Mode A

Mode A is the mode in which the level of automated driving is highest. In cases in which Mode A is being implemented, all vehicle controls, such as complex merging control, are performed automatically, such that a vehicle occupant does not need to monitor the surroundings or state of the vehicle M.

Mode B

Mode B is the mode having the next highest level of automated driving after Mode A. Although in principle all vehicle control is performed automatically in cases in which Mode B is implemented, the driving operation of the vehicle M may be entrusted to the vehicle occupant depending on the situation. The vehicle occupant therefore needs to monitor the surroundings and state of the vehicle M.

Mode C

Mode C is the mode having the next highest level of automated driving after Mode B. In cases in which Mode C is implemented, the vehicle occupant needs to perform confirmation operations on the HMI 70 depending on the situation. In Mode C, for example, the vehicle occupant is notified of the timing for a lane change, and the lane change is made automatically in cases in which the vehicle occupant has performed an operation on the HMI 70 instructing the lane change. The vehicle occupant therefore needs to monitor the surroundings and state of the vehicle M.

The automated driving mode controller 130 determines the automated driving mode based on operation on the HMI 70 by the vehicle occupant, events determined by the action plan generation section 144, traveling states determined by the course generation section 146, and the like. The automated driving mode is notified to the HMI controller 170. Moreover, a limit that depends on the performance of the detection devices DD of the vehicle M or the like may be set on the automated driving mode. For example, configuration may be such that the Mode A is not implemented in cases in which the performance of the detection devices DD is low. Whichever the mode, switching to manual driving mode (override) is possible by operating the driving operation system configuration of the HMI 70.

The vehicle position recognition section 140 of the automated driving controller 120 recognizes the lane in which the vehicle M is traveling (the lane of travel) and the position of the vehicle M relative to the travel lane, based on the high precision map information 182 stored in the storage section 180, and the information input from the finders 20, the radars 30, the camera 40, the navigation device 50, or the vehicle sensors 60.

The vehicle position recognition section 140, for example, recognizes the travel lane by comparing a pattern of road demarcation lines (for example, an array of solid lines and dashed lines) recognized in the high precision map information 182 against a road demarcation line pattern of the surroundings of the vehicle M recognized in the images captured using the camera 40. In the recognition, the position of the vehicle M acquired from the navigation device 50 or the processing result by the INS may be taken into account.

Figure 4:
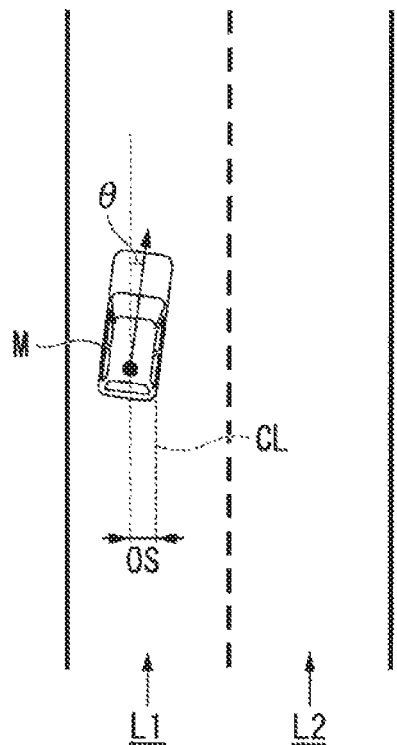
FIG. 4 is a diagram illustrating a state in which the position of a vehicle relative to a travel lane is recognized by a vehicle position recognition section in the first exemplary embodiment.

FIG. 4 is a diagram illustrating a state in which the relative position of the vehicle M with respect to a travel lane L1 is recognized by the vehicle position recognition section 140. As the relative position of the vehicle M with respect to the travel lane L1, the vehicle position recognition section 140 recognizes an offset OS between a reference point (for example, the center of mass) of the vehicle M and a travel lane center CL, and an angle θ formed between the direction of progress of the vehicle M and a line aligned with the travel lane center CL. Note that, alternatively, the vehicle position recognition section 140 may recognize the position of the reference point of the vehicle M or the like with respect to either of the side end portions of the travel lane L1 as the relative position of the vehicle M with respect to the travel lane. The relative position of the vehicle M recognized by the vehicle position recognition section 140 is provided to the target lane determination section 110.

The environment recognition section 142 recognizes the position, speed, acceleration state, and the like of nearby vehicles, and monitors conditions surrounding the vehicle M, based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be presented as representative points such as centers of mass or corners of other vehicles, or may be represented as regions expressed by the outlines of the other vehicles. The "state" of a nearby vehicle may include whether or not the nearby vehicle is accelerating or changing lanes (or whether or not the nearby vehicle is attempting to change lanes), as ascertained based on the information of the various apparatuses described above. The environment recognition section 142 may also recognize the position of a guard rail, a utility pole, a parked vehicle, a pedestrian, and other objects in addition to the nearby vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

The action plan is, for example, composed of plural events to be sequentially executed. The events include, for example: a deceleration event that causes the vehicle M to decelerate, an acceleration event that causes the vehicle M to accelerate, a lane-keep event that causes the vehicle M to travel without departing from the travel lane, a lane-change event that causes the travel lane to change, an overtake event that causes the vehicle M to overtake the vehicle in front, a junction event that causes a lane change to the desired lane at a junction point or causes the vehicle M to travel so as not to depart from the current travel lane, a merge event that causes the vehicle M to accelerate or decelerate in a merging lane for merging with a main lane and changes the travel lane, and a handover event that causes a transition from the manual driving mode to the automated driving mode at a starting point of automated driving or causes a transition from the automated driving mode to the manual driving mode at a point where automated driving is expected to end. The action plan generation section 144 sets a lane-change event, a junction event, or a merge event at places where the target lane determined by the target lane determination section 110 switches. Information indicating the action plan generated by the action plan generation section 144 is stored in the storage section 180 as the action plan information 186.

Figure 5:
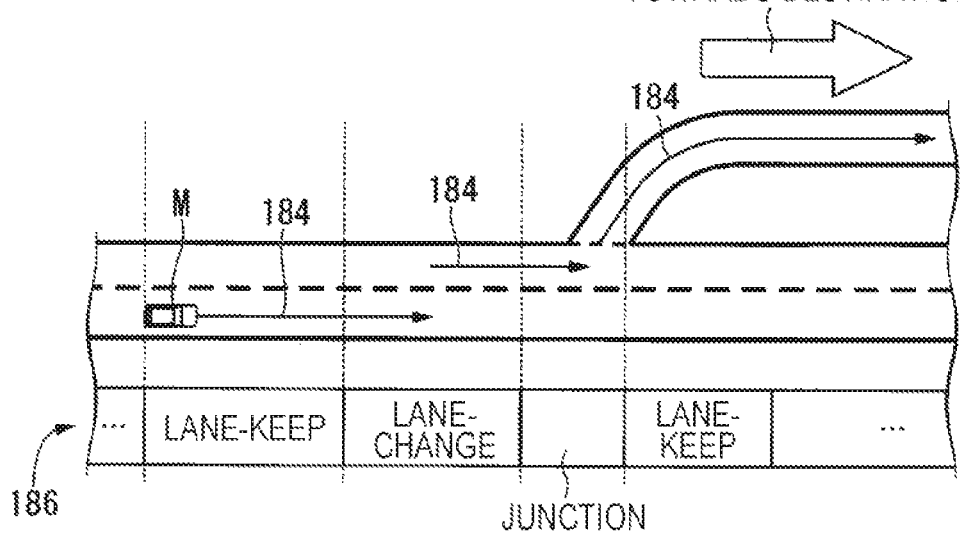
FIG. 5 is a diagram illustrating an example of an action plan generated for a given segment in the first exemplary embodiment.

FIG. 5 is a diagram illustrating an example of the action plan generated for a given segment. As illustrated in this figure, the action plan generation section 144 generates the action plan needed for the vehicle M to travel in the target lane indicated by the target lane information 184. Note that the action plan generation section 144 may dynamically change the action plan irrespective of the target lane information 184, in accordance with changes to the conditions of the vehicle M. For example, in cases in which the speed of a nearby vehicle recognized by the environment recognition section 142 during vehicle travel exceeds a threshold value, or the movement direction of a nearby vehicle traveling in a lane adjacent to the vehicle-itself lane is toward the vehicle-itself lane direction, the action plan generation section 144 changes an event set in the driving segments that the vehicle M was expected to travel. For example, in cases in which events have been set such that a lane-change event is to be executed after a lane-keep event, when, during the lane-keep event, the recognition result of the environment recognition section 142 has determined that a vehicle is approaching from the rear in the lane change target lane at a speed at or above a threshold value, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 6:
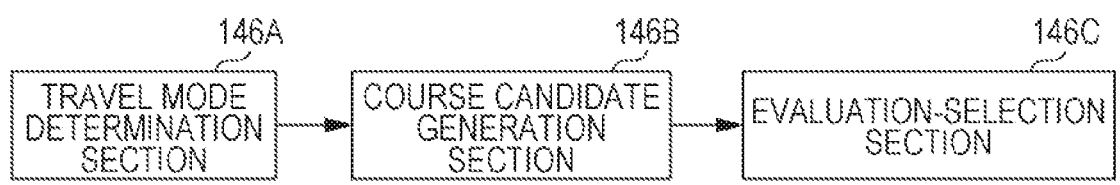
FIG. 6 is a diagram illustrating an example of a configuration of a course generation section in the first exemplary embodiment.

FIG. 6 is a diagram illustrating an example of the configuration of the course generation section 146. The course generation section 146 includes, for example, a travel mode determination section 146A, a course candidate generation section 146B, and an evaluation/selection section 146C.

When implementing a lane-keep event, the travel mode determination section 146A, for example, determines a travel mode from out of constant speed travel, following-travel, low speed following-travel, decelerating travel, curve travel, obstacle avoidance travel, or the like. In such cases, the travel mode determination section 146A determines that the travel mode is constant speed travel when no other vehicles are present ahead of the vehicle M. The travel mode determination section 146A determines that the travel mode is following-travel in cases such as when a vehicle in front is to be followed. The travel mode determination section 146A determines that the travel mode is low speed following-travel in a congested situation or the like. The travel mode determination section 146A determines that the travel mode is decelerating travel in cases in which deceleration of a vehicle in front has been recognized by the environment recognition section 142, and in cases in which an event for, for example, stopping or parking is implemented. The travel mode determination section 146A determines that the travel mode is curve travel in cases in which the environment recognition section 142 has recognized that the vehicle M is approaching a curve in the road. The travel mode determination section 146A determines that the travel mode is obstacle avoidance travel in cases in which the environment recognition section 142 has recognized an obstacle in front of the vehicle M. Moreover, when carrying out lane-change events, overtake events, junction events, merge events, handover events, or the like, the travel mode determination section 146A determines the travel mode in accordance with each event.

Figure 7:
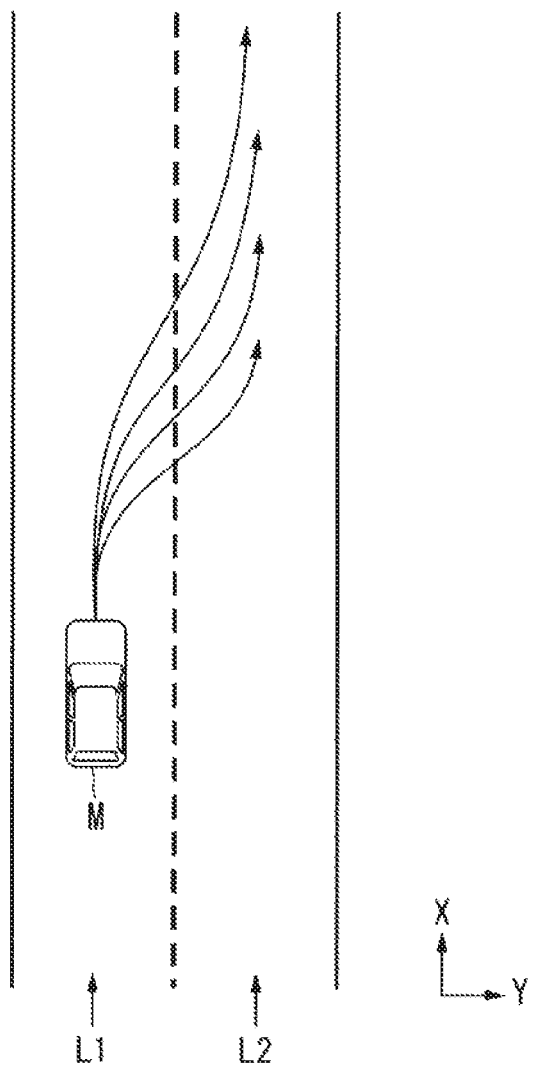
FIG. 7 is a diagram illustrating example candidates for a course generated by a course candidate generation section in the first exemplary embodiment.

The course candidate generation section 146B generates candidates for a course based on the travel mode determined by the travel mode determination section 146A. FIG. 7 is a diagram illustrating example candidates for a course generated by the course candidate generation section 146B. FIG. 7 illustrates candidates for a course generated when the vehicle M changes lanes from a lane L1 to a lane L2.

Figure 8:
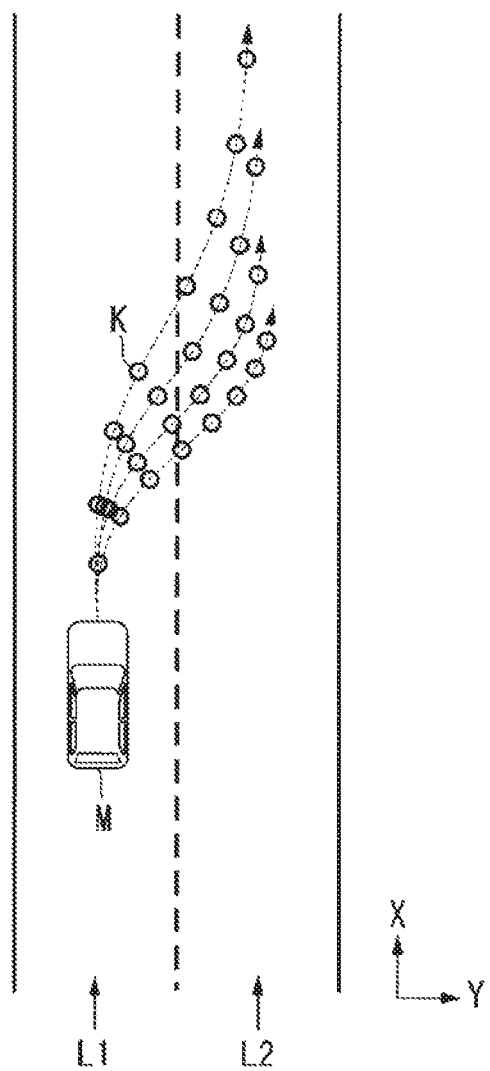
FIG. 8 is a diagram in which candidates for a course generated by a course candidate generation section are represented by course points in the first exemplary embodiment.

Courses such as illustrated in FIG. 7, for example, are determined by the course candidate generation section 146B as collections of target positions (course points K) where the reference position (for example, the center of mass or rear wheel axle center) of the vehicle M is to arrive at specific times in the future. FIG. 8 is a diagram illustrating candidates for a course generated by the course candidate generation section 146B, represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 9:
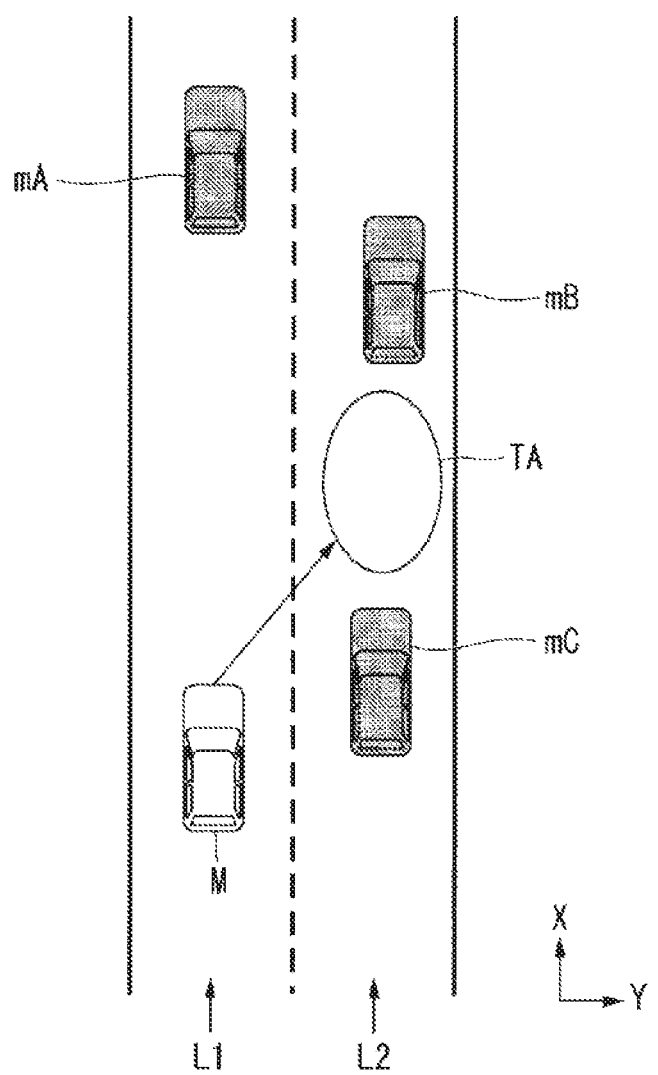
FIG. 9 is a diagram illustrating a lane change target position in the first exemplary embodiment.

Explanation follows regarding a determination method for the target speed for performing a lane change (including at junctions). The course candidate generation section 146B first sets a lane change target position (or a merge target position). The lane change target position is set as a position relative to nearby vehicles, and determines "between which nearby vehicles to change lanes". The course candidate generation section 146B observes three nearby vehicles as references for the lane change target position, and determines a target speed for performing the lane change. FIG. 9 is a diagram illustrating a lane change target position TA. In this figure, L1 represents the lane of the vehicle, and L2 represents an adjacent lane. Here, a vehicle in front mA is defined as a nearby vehicle traveling directly in front of the vehicle M in the same lane as the vehicle M, a forward reference vehicle mB is defined as a nearby vehicle traveling directly in front of the lane change target position TA, and a rear reference vehicle mC is defined as a nearby vehicle traveling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three nearby vehicles and determines a target speed that will not interfere with any of the nearby vehicles.

Figures 10, 11:
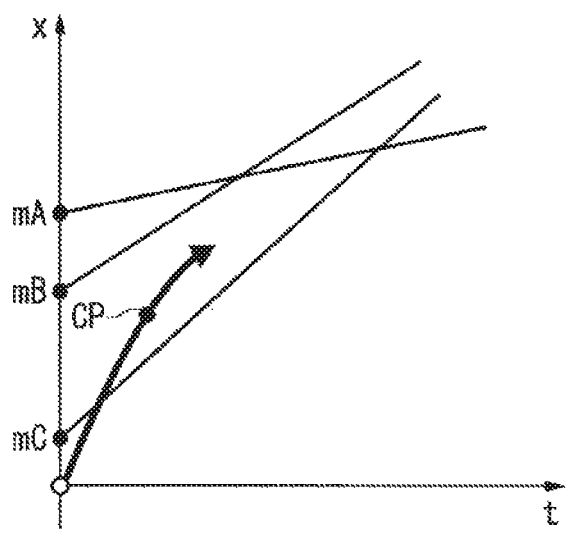
FIG. 10 is a diagram illustrating a speed generation model in a case in which the speeds of three nearby vehicles are assumed to be constant in the first exemplary embodiment.
FIG. 11 is a table illustrating an example of mode-specific operation permission information in the first exemplary embodiment.

FIG. 10 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at respective constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds are applied to a model such as a spline curve to derive plural candidates for the course as illustrated in FIG. 8. Note that the movement pattern of the three nearby vehicles is not limited to that of constant speeds such as illustrated in FIG. 10, and may be predicted under the assumption of constant acceleration or constant jerk.

The evaluation/selection section 146C, evaluates, for example, the candidates for the course generated by the course candidate generation section 146B from the two viewpoints of plan achievability and safety, and selects a course to be output to the traction controller 160. From the viewpoint of plan achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then returns is given a low evaluation. From the viewpoint of safety, for example, the further the distance between the vehicle M and an object (such as a nearby vehicle) and the smaller the amount of change in acceleration/deceleration, steering angle, or the like at each course point, the higher the evaluation.

The switch controller 150 switches between the automated driving mode and the manual driving mode based on a signal input from the automated driving changeover switch 87. The switch controller 150 also switches from the automated driving mode to the manual driving mode based on an operation on the configuration of the driving operation system of the HMI 70 instructing acceleration, deceleration, or steering. For example, the switch controller 150 switches from the automated driving mode to the manual driving mode (overrides) when a state in which an operation amount indicated by the signal input from the configuration of the driving operation system of the HMI 70 exceeds a threshold value has continued for a reference duration or longer. Note that after switching to the manual driving mode due to override, the switch controller 150 may return to the automated driving mode in cases in which operation on the configuration of the driving operation system of the HMI 70 has not been detected for a specific amount of time.

The traction controller 160 controls the traction drive force output device 200, the steering device 210, and the brake device 220 such that the vehicle M passes through the course generated by the course generation section 146 at expected timings.

When notified of information relating to the automated driving mode by the automated driving controller 120, the HMI controller 170 references the mode-specific operation permission information 188, and controls the HMI 70 according to the classification of the automated driving mode. The HMI controller 170 also includes a display controller 172 that controls the content of display on the portable display device 96 (and on the display device 82 in addition to, or instead of, on the portable display device 96) in accordance with, for example, information relating to the surroundings of the vehicle M input from the environment recognition section 142.

FIG. 11 is a table illustrating an example of the mode-specific operation permission information 188. The mode-specific operation permission information 188 illustrated in FIG. 11 includes "manual driving mode" and "automated driving mode" as driving mode items. The mode-specific operation permission information 188 includes "Mode A", "Mode B", "Mode C", and the like described above under "automated driving mode". The mode-specific operation permission information 188 also includes "navigation operation", which is an operation on the navigation device 50, "content playback operation", which is an operation on the content playback device 85, "instrument panel operation", which is an operation on the display device 82, and the like, as items of the non-driving operation system. In the example of the mode-specific operation permission information 188 illustrated in FIG. 11, permissions are set for operations by the vehicle occupant on the non-driving operation system for each of the driving modes described above; however, the relevant interface devices are not limited thereto.

The HMI controller 170 determines the devices for which usage is permitted (part or all of the navigation device 50 and the HMI 70) and the devices for which usage is not permitted, by referencing the mode-specific operation permission information 188 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system of the HMI 70 (for example, the accelerator pedal 71, the brake pedal 74, the shift lever 76, the steering wheel 78, and the like). When the driving mode executed by the vehicle control system 100 is an automated driving mode such as Mode B or Mode C, the vehicle occupant has a responsibility to monitor the surroundings of the vehicle M. In such a case, in order to prevent activities (driver distractions) other than driving (for example, operating the HMI 70) from distracting the attention of the vehicle occupant, the HMI controller 170 performs control such that part or all of the non-driving operation system of the HMI 70 does not receive operations. At such times, in order to promote monitoring of the surroundings of the vehicle M, the HMI controller 170 may cause the presence of vehicles surrounding the vehicle M that have been recognized by the environment recognition section 142 and the state of these nearby vehicles to be displayed on the display device 82 using images or the like, and the HMI controller 170 may ensure confirmation operations are received by the HMI 70 in accordance with the situation when the vehicle M is traveling.

When the driving mode is Mode A of the automated driving mode, the HMI controller 170 relaxes driver distraction regulations, and performs control such that non-driving operation systems that were not receiving operations now receive operations from the vehicle occupant. For example, the HMI controller 170 displays an image on the display device 82, outputs audio through the speaker 83, or plays back content from a DVD or the like on the content playback device 85. Note that in addition to content stored on a DVD or the like, the content played back by the content playback device 85 may include, for example, various content related to leisure and entertainment, such as television programming or the like. The "content playback operation" illustrated in FIG. 11 may also mean a content operation related to such leisure and entertainment.

Display Control

The vehicle control system 100 of the present embodiment includes functionality to, in accordance with the presence of vehicles nearby the vehicle M and the states of the nearby vehicles, display images of the surroundings of the vehicle M on various types of display devices such as the portable display device 96.

Figure 12:
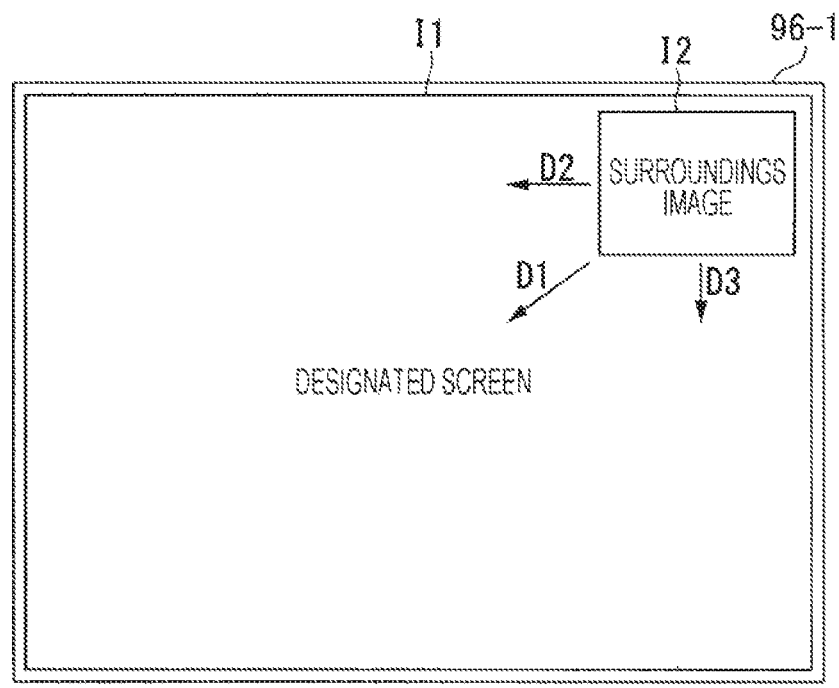
FIG. 12 is a diagram illustrating an example in which a display screen of a portable display device is displaying an image based on an operation by a vehicle occupant in the first embodiment.

FIG. 12 is a diagram illustrating an example in which a display screen 96-1 of a portable display device 96 is displaying an image (hereafter, "designated screen I1") based on an operation by the vehicle occupant during automated driving. The designated screen I1 encompasses, for example, screens that display a variety of content such as a television program, which is displayed as a result of the vehicle occupant operating the portable display device 96 (for example, a smartphone). In FIG. 12, an image of the surroundings (hereafter, "surroundings image I2") of the vehicle M captured by the camera 40 is also displayed superimposed over the designated screen I1. The portable display device 96 may display an image of the surroundings of the vehicle M captured in any direction on the display screen 96-1. The portable display device 96 may also periodically cycle through and display images of the surroundings captured in different directions on the display screen 96-1. For example, the portable display device 96 may sequentially display a forward image, a leftward image, a rearward image, and a rightward image on the display screen 96-1.

Figure 13:
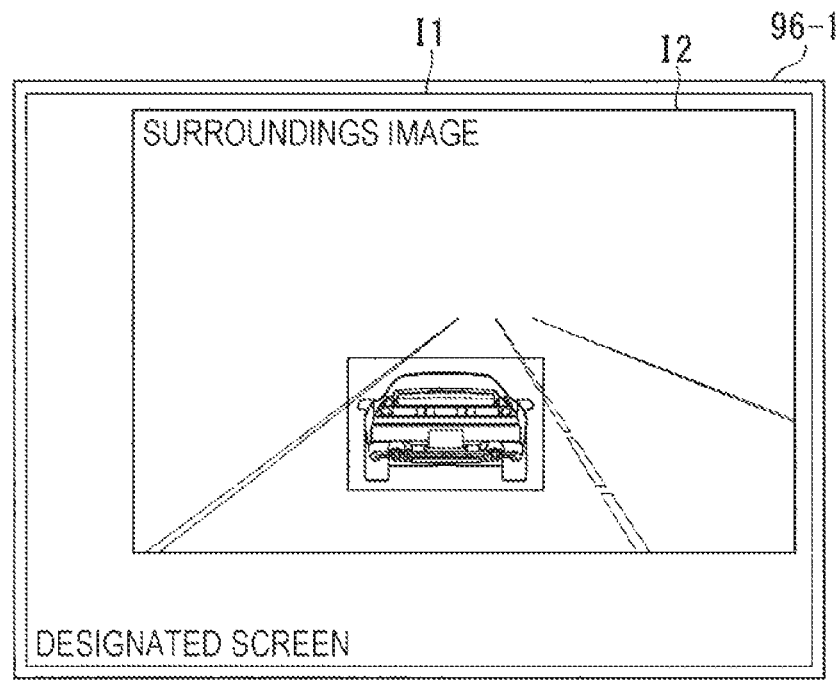
FIG. 13 is a diagram illustrating an example in which a display screen of a portable display device is displaying a surroundings image superimposed over a designated screen when a situation that requires attention has arisen in the surroundings of a vehicle in the first embodiment.

FIG. 13 is a diagram illustrating an example in which the display screen 96-1 of the portable display device 96 is displaying a surroundings image I2 superimposed over the designated screen I1 when a situation that requires attention has arisen in the surroundings of the vehicle M during automated driving. In FIG. 13, the region in which the surroundings image I2 illustrated in FIG. 12 is displayed on the display screen 96-1 is enlarged along the D1, D2, and D3 directions. When this is performed, the target object (for example, another vehicle) that caused the situation requiring attention may be highlighted.

Figure 14:
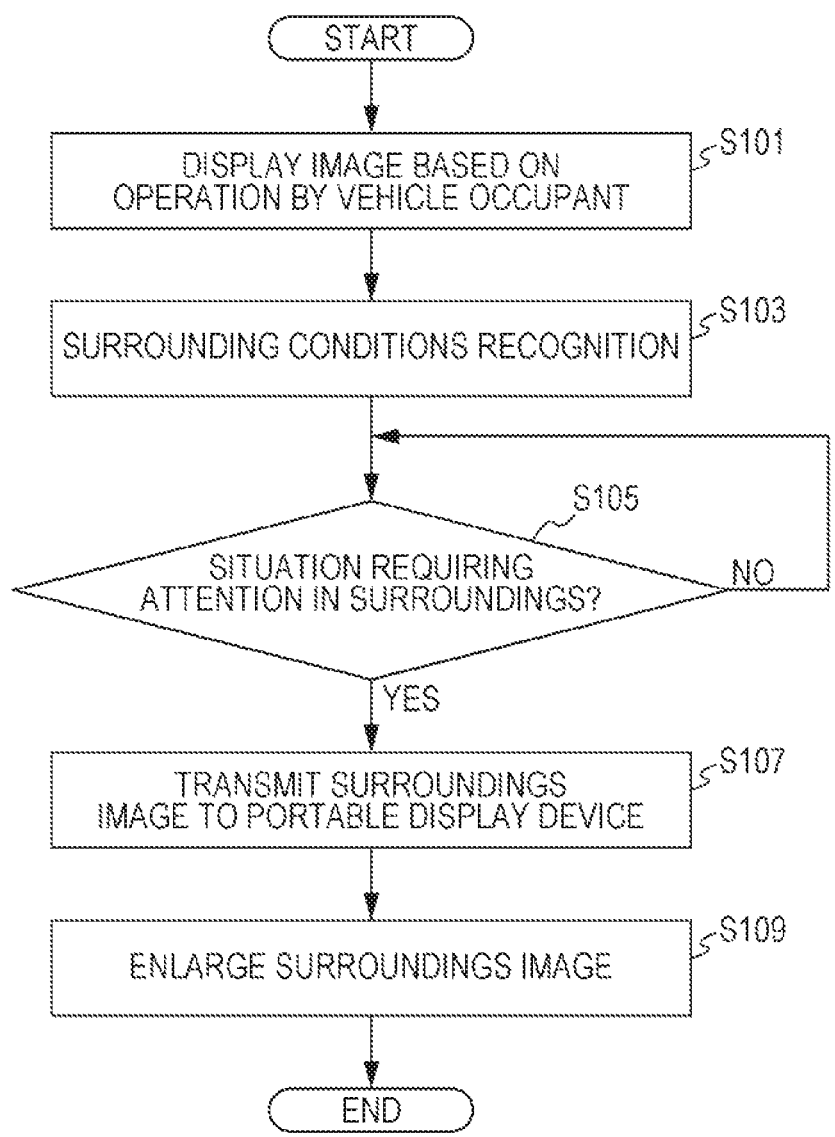
FIG. 14 is a flowchart illustrating an example of processing to display an image of the surroundings of a vehicle on a portable display device in the first embodiment.

Explanation follows regarding actions to display an image of the surroundings of the vehicle M on the portable display device 96. FIG. 14 is a flowchart illustrating an example of processing to display an image of the surroundings of the vehicle M on the portable display device 96. Note that this flowchart is similarly applicable to processing to display an image of the surroundings of the vehicle M on the display device 82 in addition to, or instead of, on the portable display device 96.

First, a vehicle occupant operates the portable display device 96, causing a designated screen I1 such as illustrated in FIG. 12 to be displayed on the portable display device 96 (step S101). For example, the vehicle occupant causes a content image (for example, a television program) to be displayed on the display screen of the portable display device 96. In parallel, an image of the surroundings of the vehicle M captured by the camera 40 (for example, an image of in front of the vehicle M) is also displayed superimposed over the content image on the display screen of the portable display device 96. The portable display device 96 may acquire an image of the surroundings by performing wireless communication with the vehicle control system 100, which has acquired an image of the surroundings of the vehicle M from the camera 40.

Next, the environment recognition section 142 recognizes the position, speed, acceleration state, and the like of nearby vehicles based on information input from the camera 40, monitors the state of the surroundings, and outputs a monitoring result to the display controller 172 (step S103).

Figure 15:
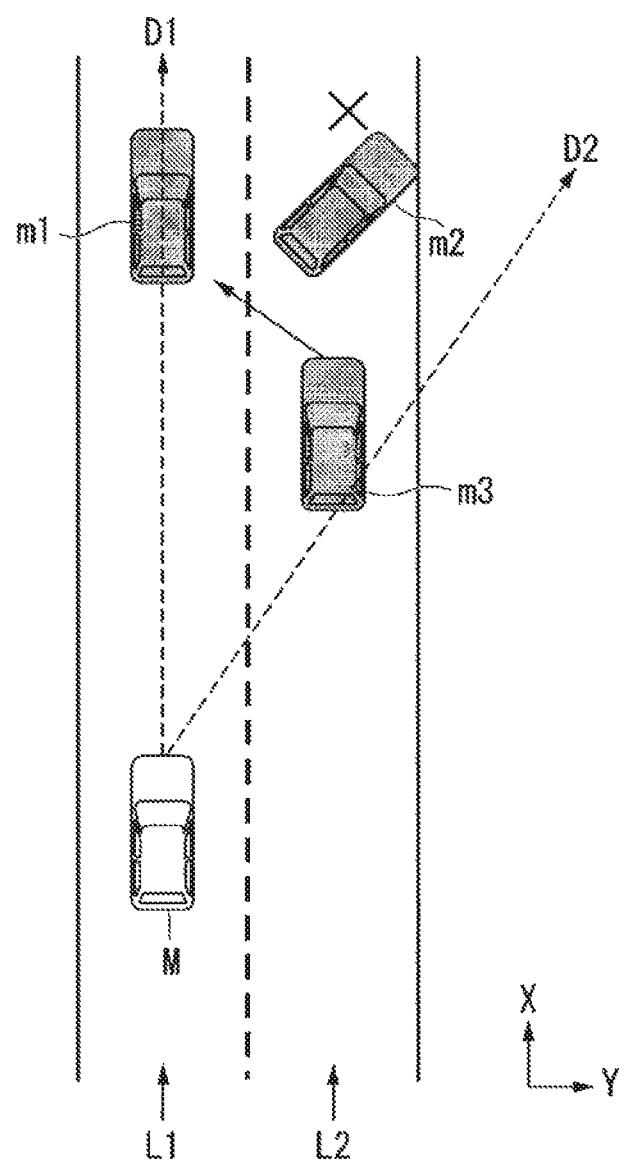
FIG. 15 is a diagram illustrating a relationship between a position where an accident occurred and a region of an image of the surroundings of a vehicle for which attention is required in the first embodiment.

Next, the display controller 172 determines whether or not a situation requiring attention has arisen in the conditions surrounding the vehicle M based on the monitoring result input from the environment recognition section 142 (step S105). Using the scenario such as illustrated in FIG. 9 as an example, the determination of whether or not a situation requiring attention has arisen in the conditions surrounding the vehicle M is performed based on whether the respective time-to-collision (TTC) between the vehicle M and a vehicle in front mA, a forward reference vehicle mB, and a rear reference vehicle mC are all greater than a threshold value. In cases in which the respective TTC between the vehicle M and the vehicle in front mA, the forward reference vehicle mB, and the rear reference vehicle mC are all greater than a threshold value, the display controller 172 determines that a situation requiring attention has not arisen in the conditions surrounding the vehicle M. However, in cases in which at least one TTC between the vehicle M and the vehicle in front mA, the forward reference vehicle mB, or the rear reference vehicle mC is below a threshold value, the display controller 172 determines that a situation requiring attention has arisen in the conditions surrounding the vehicle M. As illustrated in FIG. 15, the display controller 172 also determines that a situation requiring attention has arisen in the surroundings of the vehicle M when an accident involving another vehicle (other vehicle m2) has occurred in the conditions surrounding the vehicle M. Information relating to an accident involving another vehicle can be obtained, for example, by referencing the high precision map information 182 stored in the storage section 180. Alternatively, information relating to an accident involving another vehicle can be obtained by communication with other vehicles (other vehicle m1, other vehicle m2, and other vehicle m3) through the communication device 55.

In cases in which it has been determined that a situation requiring attention has not arisen, the display controller 172 continues to determine whether a situation requiring attention has arisen in the conditions surrounding the vehicle M. However, in cases in which it has been determined that a situation requiring attention has arisen, the display controller 172 transmits an image of the surroundings in which a situation requiring attention has arisen to the portable display device 96 via wireless communication (step S107). For example, in cases in which the TTC between the vehicle M and the vehicle in front mA is below a threshold value, the display controller 172 transmits an image of in front of the vehicle M to the portable display device 96. Additionally, as illustrated in FIG. 15, in cases in which an accident involving another vehicle has occurred in the surroundings of the vehicle M, the display controller 172 transmits an image captured in the direction of the other vehicle m2 that caused the accident (an image between the direction D1 and the direction D2) to the portable display device 96.

Next, the portable display device 96 enlarges the display area of the image of the surroundings input from the display controller 172 superimposed over the designated screen I1 (for example, enlarged along the D1, D2, and D3 directions in FIG. 12), and the processing of the flowchart ends (step S109). Note that the portable display device 96 may display the image of the surroundings input from the display controller 172 over the entirety of the display screen 96-1.

In the above embodiment, a vehicle occupant is able to quickly check an image indicating both that a situation requiring attention has arisen in the surroundings of the vehicle M and the situation requiring attention, even when the vehicle occupant is looking at the designated screen I1 displayed on the portable display device 96.

Second Embodiment

Explanation follows regarding a second embodiment. A vehicle control system according to the second embodiment differs from that of the first embodiment in that when it has been determined that a situation requiring attention has arisen, an image of the surroundings in which the situation requiring attention has arisen is displayed overlaid onto various mirrors. In following explanation, portions similar to that of the above first embodiment are appended with the same reference numerals, and explanation thereof is omitted or abbreviated.

Figure 16:
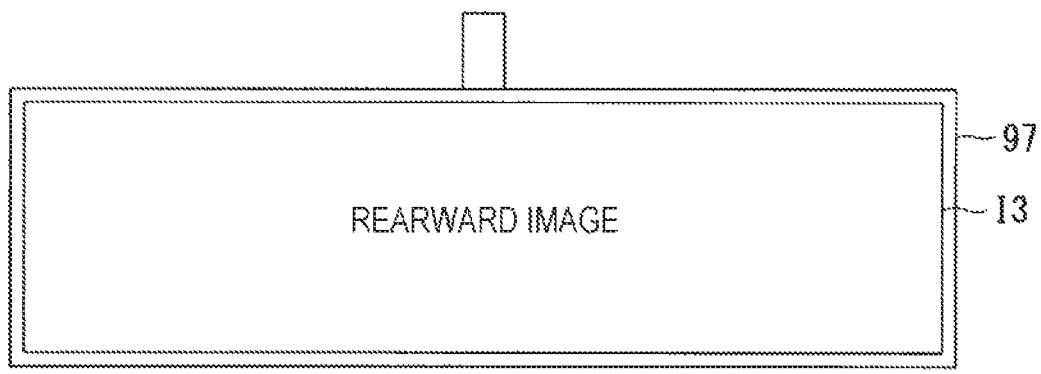
FIG. 16 is a diagram illustrating an example of a rear-view mirror depicting an area behind a vehicle as seen by a vehicle occupant seated in a driving seat in a second embodiment.
Figure 17:
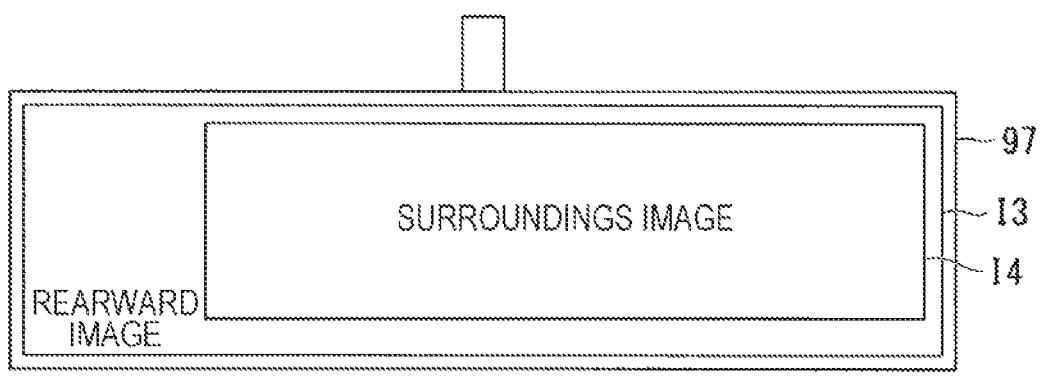
FIG. 17 is a diagram illustrating an example of a rear-view mirror displaying an image of the surroundings of a vehicle for which attention is required superimposed over an image rearward of the vehicle in the second embodiment.

FIG. 16 is a diagram illustrating an example of a rear-view mirror 97 depicting an area behind the vehicle M as seen by a vehicle occupant seated in the driving seat (hereafter, "rearward image I3") during automated driving. FIG. 17 is a diagram illustrating an example of a rear-view mirror 97 displaying a surroundings image I4 of the vehicle M for which attention is required superimposed over the rearward image I3 when a situation that requires attention has arisen in the surroundings of the vehicle M during automated driving. The display controller 172 controls whether or not to display the surroundings image I4 of the vehicle M superimposed over the rearward image I3 on the rear-view mirror 97 in accordance with, for example, information relating to the surroundings of the vehicle M input from the environment recognition section 142.

Figure 18:
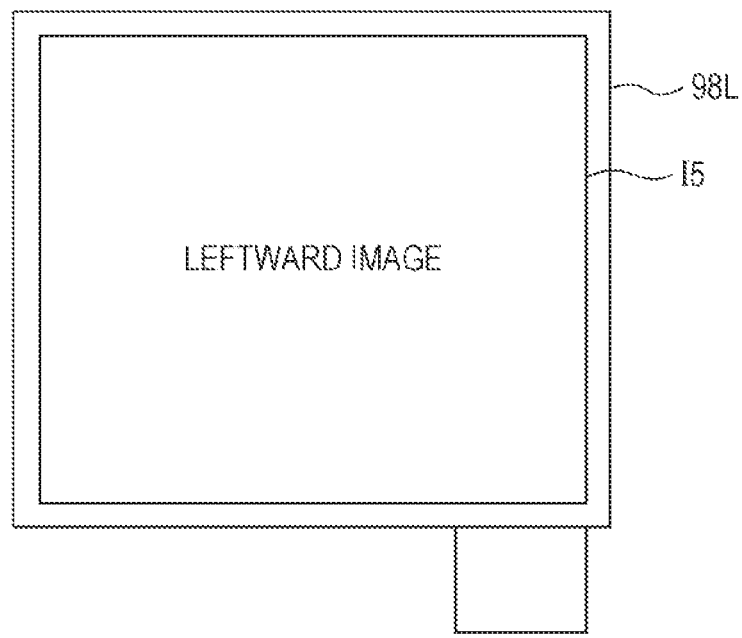
FIG. 18 is a diagram illustrating an example of a left side-view mirror depicting an area to the left of a vehicle as seen by a vehicle occupant seated in a driving seat in the second embodiment.
Figure 19:
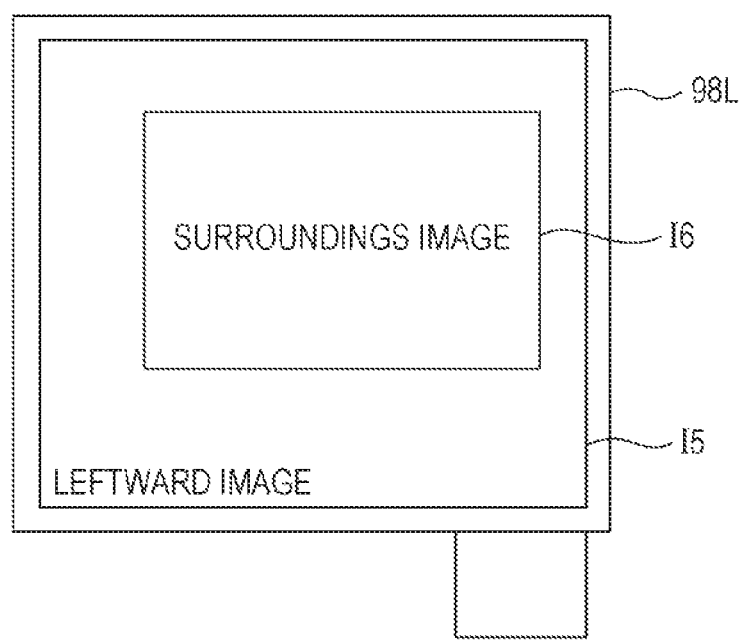
FIG. 19 is a diagram illustrating an example of a left side-view mirror displaying an image of the surroundings of a vehicle for which attention is required superimposed over an image leftward of the vehicle in the second embodiment.

FIG. 18 is a diagram illustrating an example of a left side-view mirror 98L depicting an area to the left of the vehicle M as seen by a vehicle occupant seated in the driving seat (hereafter, "leftward image I5") during automated driving. FIG. 19 is a diagram illustrating an example of a left side-view mirror 98L displaying a surroundings image I6 of the vehicle M for which attention is required superimposed over the leftward image I5 when a situation that requires attention has arisen in the surroundings of the vehicle M during automated driving. The display controller 172 controls whether or not to display the surroundings image I6 of the vehicle M superimposed over the leftward image I5 on a side-view mirror 98 in accordance with, for example, information relating to the surroundings of the vehicle M input from the environment recognition section 142. Note that a right side-view mirror 98R has a similar configuration to that of the left side-view mirror 98L above. The display controller 172 controls whether or not to display an image of the surroundings of the vehicle M superimposed over an image of an area to the right of the vehicle M as seen by a vehicle occupant seated in the driving seat displayed by the right side-view mirror 98R in accordance with, for example, information relating to the surroundings of the vehicle M input from the environment recognition section 142. In the following, explanation relating to the side-view mirrors 98 is primarily given using the left side-view mirror 98L as an example.

Figure 20:
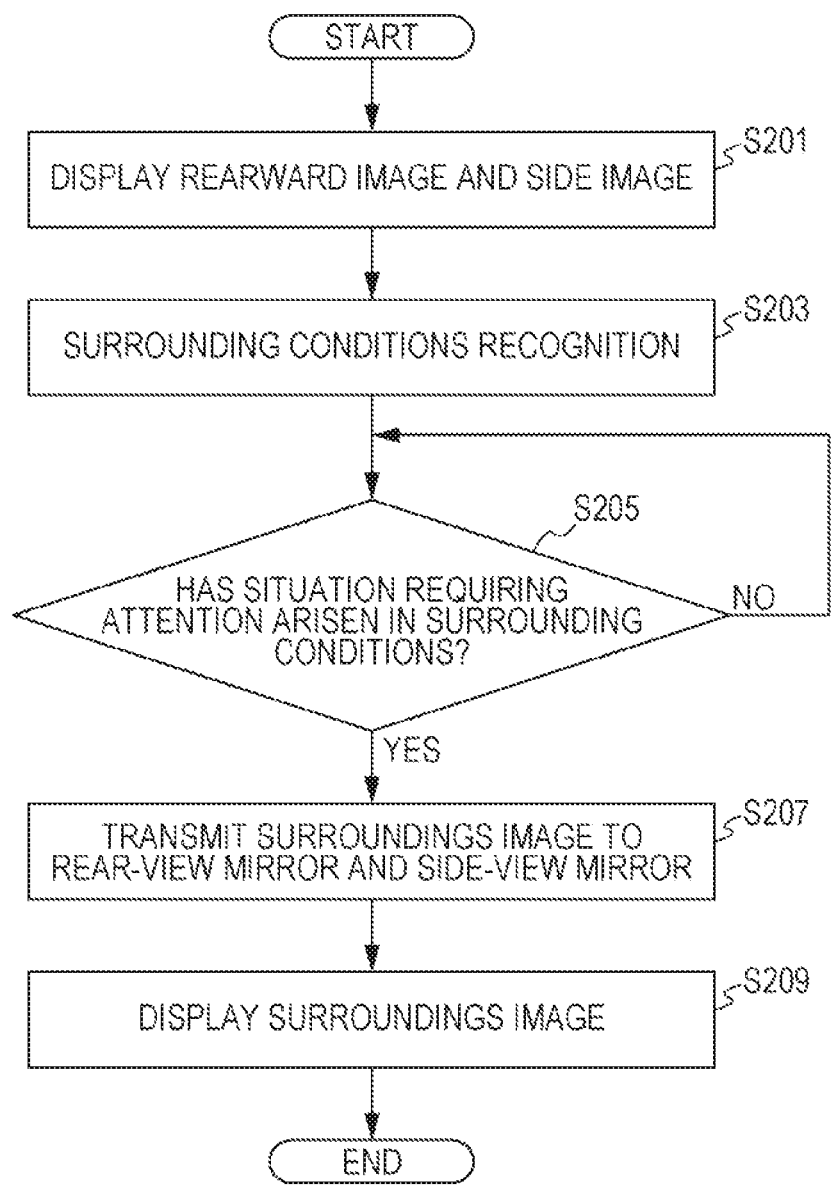
FIG. 20 is a flowchart illustrating an example of processing to display an image of the surroundings of a vehicle on various mirrors in the second embodiment.

Explanation follows regarding actions to display an image of the surroundings of the vehicle M on the rear-view mirror 97 and the side-view mirrors 98. FIG. 20 is a flowchart illustrating an example of processing to display an image of the surroundings of the vehicle M on the rear-view mirror 97 and the side-view mirrors 98.

First, a rearward image I3, as seen by a vehicle occupant seated in the driving seat, is depicted on the rear-view mirror 97 during automated driving. Additionally a leftward image I5, as seen by a vehicle occupant seated in the driving seat, is depicted on the left side-view mirror 98L (step S201).

Next, the environment recognition section 142 recognizes the position, speed, acceleration state, and the like of nearby vehicles based on information input from the camera 40, and outputs a recognition result to the display controller 172 (step S203).

Next, the display controller 172 determines whether or not a situation requiring attention has arisen in the conditions surrounding the vehicle M based on the recognition result input from the environment recognition section 142 (step S205).

In cases in which it has been determined that a situation requiring attention has not arisen, the display controller 172 continues to determine whether a situation requiring attention has arisen in the conditions surrounding the vehicle M. However, in cases in which it has been determined that a situation requiring attention has arisen, the display controller 172 transmits an image of the surroundings in which a situation requiring attention has arisen to the rear-view mirror 97 and the side-view mirrors 98 (step S207).

Next, the rear-view mirror 97 displays the image of the surroundings input from the display controller 172 superimposed over the rearward image I3. The left side-view mirror 98L also displays the image of the surroundings input from the display controller 172 superimposed over the leftward image I5 (step S209). Then, the processing of the flowchart ends. Note that the rear-view mirror 97 and the side-view mirrors 98 may display the image of the surroundings input from the display controller 172 over the entirety of the mirrors.

In the above embodiment, a vehicle occupant is able to quickly check an image indicating both that a situation requiring attention has arisen in the surroundings of the vehicle M and the situation requiring attention, even when the vehicle occupant is looking at the rear-view mirror 97 or the side-view mirrors 98.

Note that in the above, explanation has been given using an example in which an image of surroundings is displayed superimposed over both the rear-view mirror 97 and the side-view mirrors 98. However, the image of surroundings may be displayed superimposed over just one of the rear-view mirror 97 or the side-view mirrors 98, or may be displayed superimposed over just one of the left side-view mirror 98L or the right side-view mirror 98R. Such mirror(s) may be selected by the display controller 172. For example, the display controller 172 determines the direction in which the situation requiring attention has occurred with respect to the own vehicle, that is, forward, rearward, left side or right side, then, select the mirror corresponding to such direction.

Third Embodiment

Explanation follows regarding a third embodiment. A vehicle control system according to the third embodiment differs from that of the first embodiment in that the gaze of a vehicle occupant seated in the driving seat is detected and an image of the surroundings of the vehicle M is displayed on display devices, various mirrors, and the like present in the field of view of the vehicle occupant. In following explanation, portions similar to that of the above first embodiment are appended with the same reference numerals, and explanation thereof is omitted or abbreviated.

Figure 21:
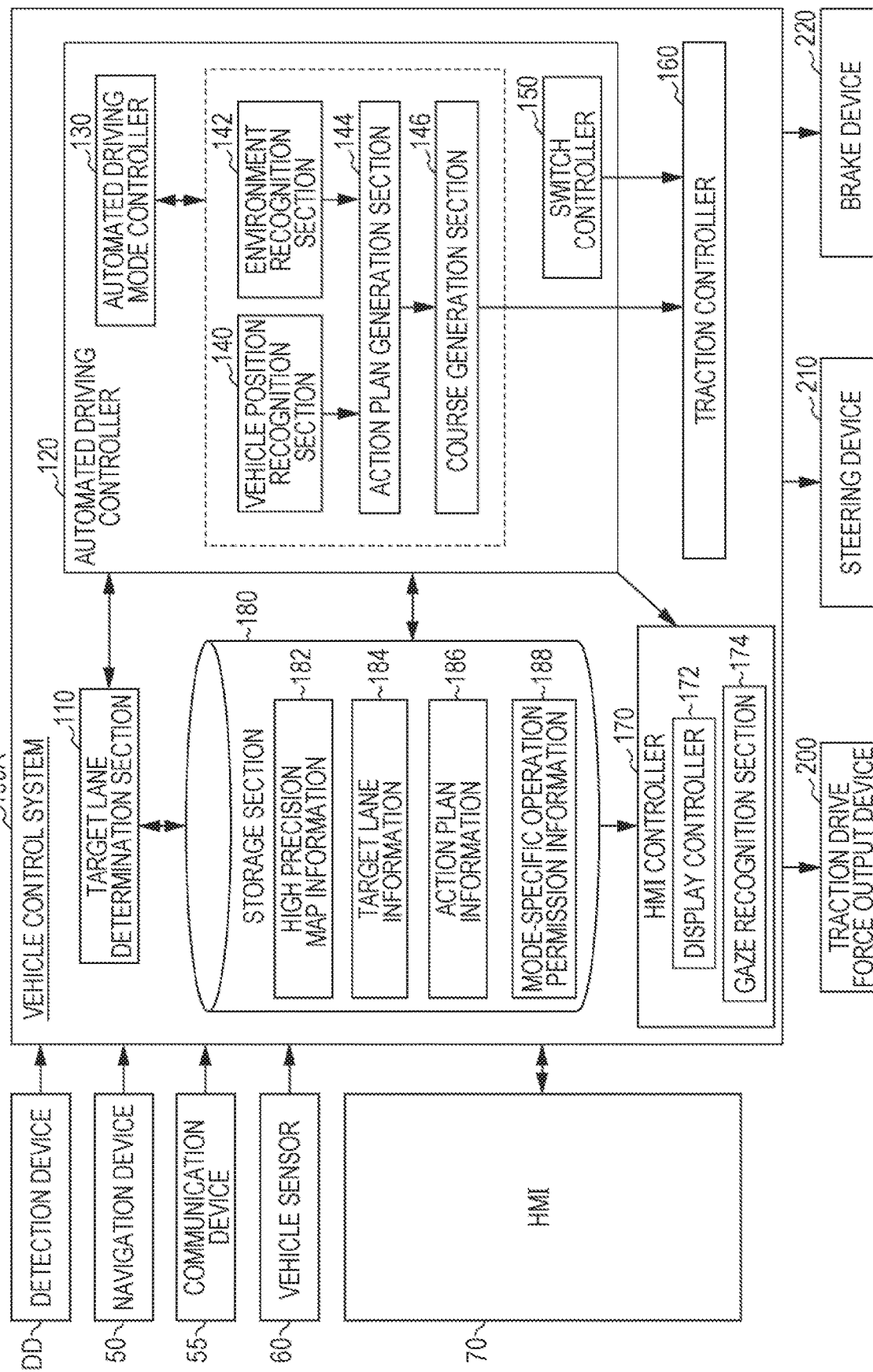
FIG. 21 is a functional configuration diagram of a vehicle in a third embodiment.

FIG. 21 is a functional configuration diagram of a vehicle M in the third embodiment. In comparison to that of the first embodiment, the HMI controller 170 of the vehicle M of the third embodiment further includes a gaze detection section (detection section) 174 that detects a direction of the gaze of a vehicle occupant seated in the driving seat. The gaze detection section 174 detects the gaze of the vehicle occupant based on an image of the vehicle occupant input from the in-cabin camera 95, and outputs a detection result to the display controller 172.

Figure 22:
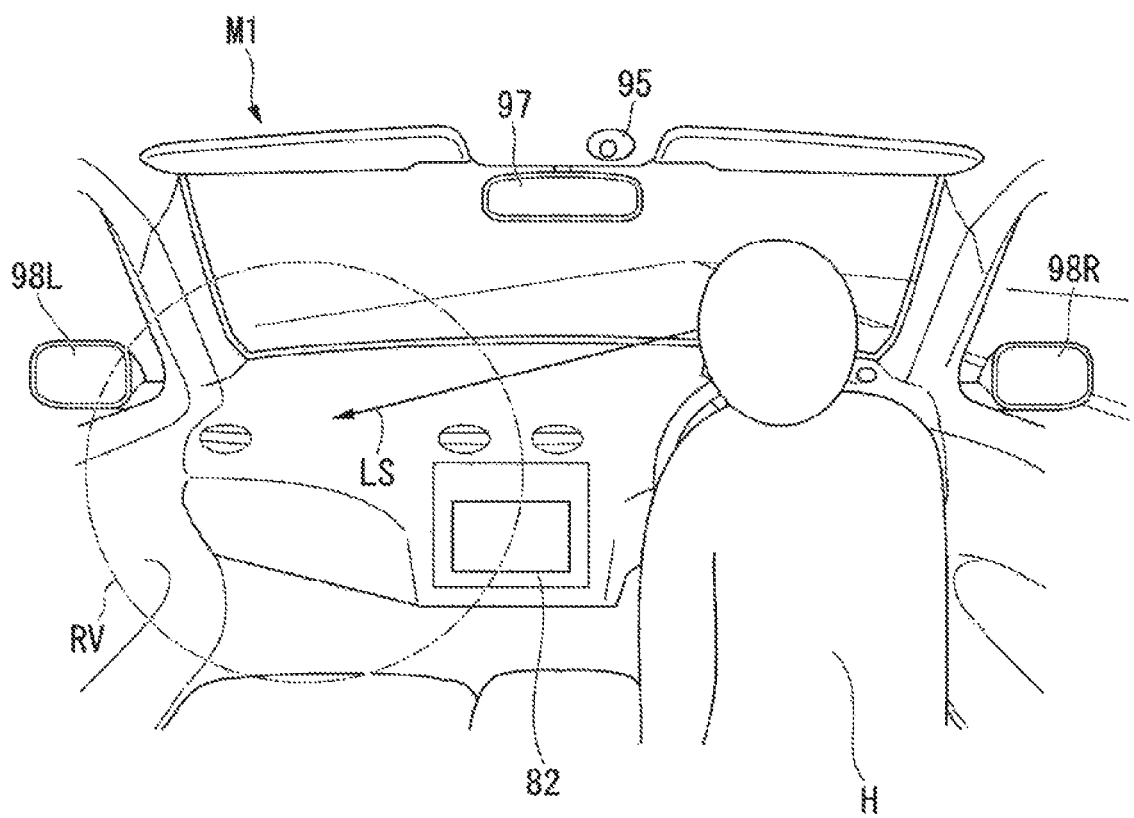
FIG. 22 is a diagram illustrating a relationship between the gaze of a vehicle occupant seated in a driving seat and a display device and various mirrors present in a direction corresponding to the gaze in the third embodiment.

FIG. 22 is a diagram illustrating a relationship between the gaze of a vehicle occupant H seated in the driving seat and display devices and various mirrors present in a direction corresponding to the gaze in a vehicle cabin M1. FIG. 22 illustrates an example in which the vehicle occupant H is facing a lower front left direction LS in the vehicle M. The gaze detection section 174 detects that the gaze of the vehicle occupant H is the lower front left direction LS based on an image of the vehicle occupant H captured by the in-cabin camera 95, and outputs a detection result to the display controller 172. The display controller 172 determines the field of view RV of the vehicle occupant H based on the direction LS of the gaze of the vehicle occupant H, selects the display devices, various mirrors, and the like that the vehicle occupant H may be looking at, and displays the image of the surroundings. In the example illustrated in FIG. 22, the display device 82 and the left side-view mirror 98L are included within the field of view RV, and the rear-view mirror 97 and the right side-view mirror 98R are not included within the field of view RV. In such a case, the display controller 172 would display the image of the surroundings on the display device 82 and the left side-view mirror 98L. In this manner, in cases in which there are plural displays present in a direction corresponding to a gaze of the vehicle occupant H, the display controller 172 displays the image of the surroundings on each of these plural displays.

Figure 23:
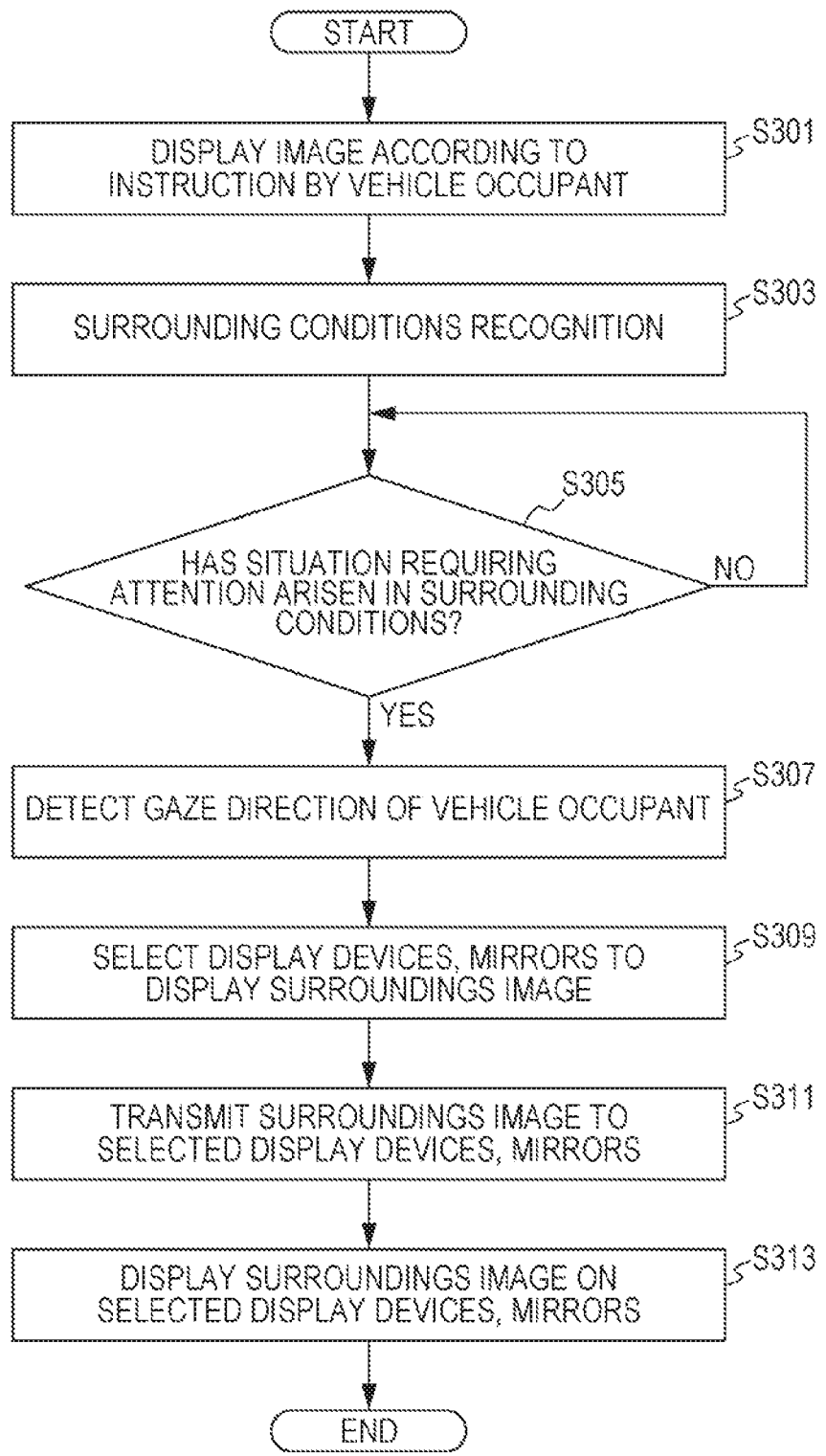
FIG. 23 is a flowchart illustrating an example of processing to display an image of the surroundings of a vehicle on a display device and various mirrors in the third embodiment.

Explanation follows regarding actions to display an image of the surroundings of the vehicle M on the display device 82, the rear-view mirror 97, and the side-view mirrors 98 of the present embodiment. FIG. 23 is a flowchart illustrating an example of processing to display an image of the surroundings of the vehicle M on the display device 82, the rear-view mirror 97, and the side-view mirrors 98.

First, a vehicle occupant operates the content playback device 85, the navigation device 50, or the like, causing a desired designated screen to be displayed on the display screen of the display device 82 (step S301).

Next, the environment recognition section 142 recognizes the position, speed, acceleration state, and the like of nearby vehicles based on information input from the camera 40, and outputs a recognition result to the display controller 172 (step S303).

Next, the display controller 172 determines whether or not a situation requiring attention has arisen in the conditions surrounding the vehicle M based on the recognition result input from the environment recognition section 142 (step S305).

In cases in which it has been determined that a situation requiring attention has not arisen, the display controller 172 continues to determine whether a situation requiring attention has arisen in the conditions surrounding the vehicle M. However, in cases in which it has been determined that a situation requiring attention has arisen, the display controller 172 outputs an image of the vehicle occupant H that has been captured by the in-cabin camera 95 to the gaze detection section 174. The gaze detection section 174 detects the gaze of the vehicle occupant H based on the image of the vehicle occupant H, and outputs a detection result to the display controller 172 (step S307).

Next, the display controller 172 determines the field of view RV of the vehicle occupant H based on the information relating to the gaze of the vehicle occupant H input from the gaze detection section 174, and selects the display devices, various mirrors, and the like that the vehicle occupant H may be looking at (step S309). In the example illustrated in FIG. 22, the display device 82 and the left side-view mirror 98L are included within the field of view RV.

Next, the display controller 172 transmits an image of the surroundings in which a situation requiring attention has arisen to the selected ones of the display devices and various mirrors (step S311). In the example of FIG. 22, the image of the surroundings is transmitted to the display device 82 and the left side-view mirror 98L.

In cases in which the display device 82 has been selected as being included within the field of view RV, the display device 82 displays the image of the surroundings input from the display controller 172 superimposed over the designated screen (step S313). In cases in which the left side-view mirror 98L has been selected as being included within the field of view RV, as illustrated in FIG. 19, the left side-view mirror 98L displays the surroundings image I6 input from the display controller 172 superimposed over the leftward image I5 (step S313). Then, the processing of the flowchart ends.

In the above embodiment, an image of surroundings for which attention is required can be displayed on display devices, various mirrors, and the like that a vehicle occupant H may be looking at during automated driving. The vehicle occupant H is thereby able to quickly check an image indicating both that a situation requiring attention has arisen in the surroundings of the vehicle M and the situation requiring attention.

Fourth Embodiment

Explanation follows regarding a fourth embodiment. A vehicle control system according to the fourth embodiment includes functionality to display assisting information corresponding to an event included in an action plan on various mirrors or display devices during automated driving. In the following explanation, portions similar to that of the above first embodiment are appended with the same reference numerals, and explanation thereof is omitted or abbreviated. In the following, explanation is given regarding an example in which assisting information is displayed on various mirrors.

Figure 24:
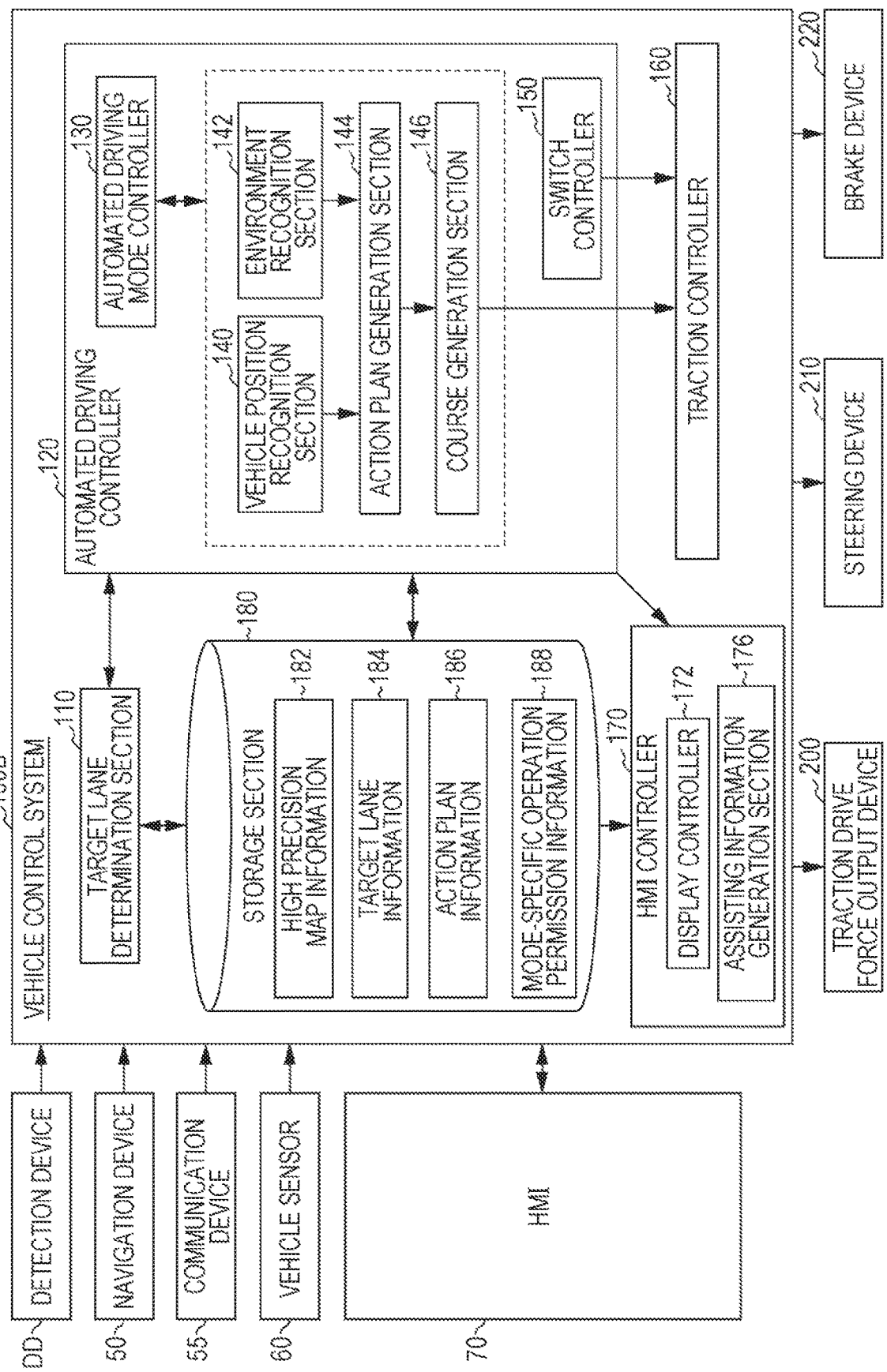
FIG. 24 is a functional configuration diagram of a vehicle in a fourth embodiment.
Figure 25:
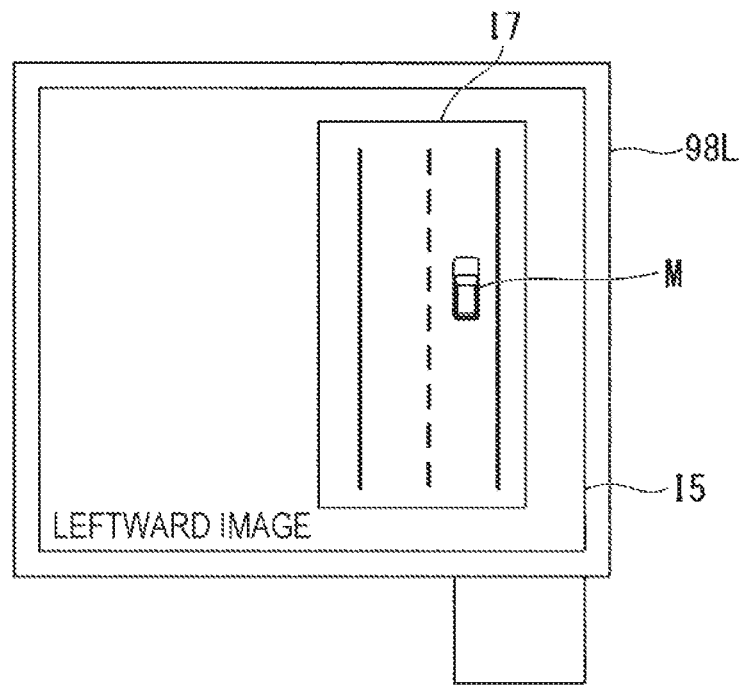
FIG. 25 is a flowchart illustrating an example of processing to display assisting information on various mirrors in the fourth embodiment.

FIG. 24 is a functional configuration diagram of a vehicle M in the present embodiment. In comparison to that of the first embodiment, the HMI controller 170 of the vehicle M of the fourth embodiment further includes an assisting information generation section 176. The assisting information generation section 176 generates assisting information that assists the confirmation of automated driving conditions by a vehicle occupant based on the action plan input from the action plan generation section 144 and information relating to the surroundings input from the environment recognition section 142. The assisting information encompasses images or the like illustrating the state of other vehicles in the surroundings of the vehicle M. FIG. 25 is a diagram illustrating an example in which assisting information is displayed on a left side-view mirror 98L. For example, when the vehicle M is to perform a lane change to a left lane during automated driving, the vehicle occupant is able to confirm that another vehicle is not present to the rear in the adjacent lane and confirm that automated driving is being appropriately executed by checking assisting information displayed on the left side-view mirror 98L. For example, the display controller 172 may select the mirror to display the assisting information based on the action plan or event to be taken. For example, the display controller 172 determines the direction in which the next event occurs with respect to the own vehicle, that is, forward acceleration, reverse movement, lane change to the left lane or lane change to the right lane, then, select the mirror corresponding to such direction.

Figure 26:
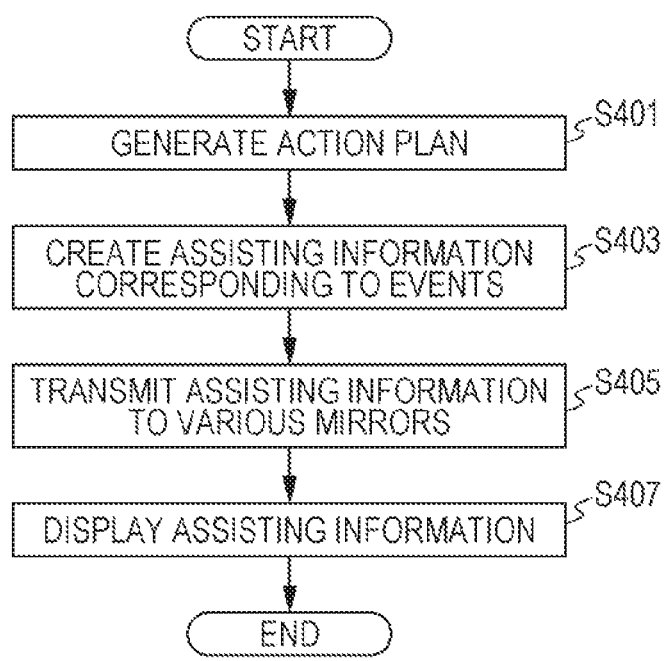
FIG. 26 is a diagram illustrating an example of a left side-view mirror displaying assisting information in the fourth embodiment.

Next, explanation follows regarding actions to display assisting information corresponding to events included in an action plan on various mirrors in the present embodiment. FIG. 26 is a flowchart illustrating an example of processing to display assisting information on various mirrors in the present embodiment.

First, the action plan generation section 144 generates an action plan for desired segments, and outputs the action plan to the assisting information generation section 176 (step S401).

Next, the assisting information generation section 176 generates assisting information corresponding to the events included in the action plan input from the action plan generation section 144, and outputs the assisting information to the display controller 172 (step S403).

Next, the display controller 172 transmits the assisting information input from the assisting information generation section 176 to the various mirrors (step S405). For example, when the vehicle M is performing a lane change to a left lane, in accordance with implementation of the lane change, assisting information expressing the state of another vehicle in the left lane is transmitted to the left side-view mirror 98L.

Next, the left side-view mirror 98L displays a screen (hereafter, "assisting screen I7") illustrating the assisting information input from the display controller 172 superimposed over the leftward image I5, and the processing of the flowchart ends (step S407). Thus, in cases in which a vehicle occupant looks at the left side-view mirror 98L when performing a lane change during automated driving, the vehicle occupant is able to confirm that another vehicle is not present to the rear in the adjacent lane by checking the mirror together with the assisting information.

In the above embodiment, a vehicle occupant is able to check assisting information corresponding to events included in an action plan on various mirrors or display devices during automated driving, and confirm that that automated driving is being appropriately executed.

Note that the above explanation was explained using an example in which the assisting information is displayed on the side-view mirrors 98. However, when the vehicle M is moving in reverse, the assisting information may be displayed on the rear-view mirror 97.

In the above embodiments, although explanation was given using an example in which the vehicle M is provided with various mirrors, the present disclosure is also applicable to mirrorless vehicles not provided with mirrors. Basically, in a mirrorless vehicle, a bird's-eye image is displayed on a display device, and an image of surroundings for which attention is required may be displayed on the display device when changing lanes or the like.

Although explanation has been given above regarding modes for implementing the present disclosure with reference to exemplary embodiments, the present disclosure is not limited by these exemplary embodiments in any way, and various additional modifications and substitutions may be made within a range that does not depart from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control system comprising:
   an imaging device configured to capture an image of surroundings of a vehicle;
   a surroundings monitoring controller configured to monitor conditions surrounding the vehicle; and
   a display controller configured to:
   display, on a display present within a cabin of the vehicle and configured to display an image based on an operation by an occupant, the image of surroundings of the vehicle superimposed over part of the image based on the operation by the occupant, and
   enlarge the image of the surroundings of the vehicle in accordance with a monitoring result of the monitoring by the surroundings monitoring controller,
   wherein the image based on the operation by the occupant is different from the image of surroundings of the vehicle and the image based on the operation by the occupant does not include the image of surroundings of the vehicle.

2. A vehicle control system comprising:
   an imaging device configured to capture an image of surroundings of a vehicle;
   a surroundings monitoring controller configured to monitor conditions surrounding the vehicle;
   a display controller configured to display, by using a display configured to display an image overlaid onto a mirror provided to the vehicle, the image of surroundings of the vehicle in accordance with a monitoring result of the monitoring by the surroundings monitoring controller; and
   a detector configured to detect a gaze of the occupant of the vehicle, wherein the display controller displays the image of surroundings of the vehicle on the display present in a direction corresponding to the gaze of the occupant of the vehicle detected by the detector, and wherein, when there is a plurality of the displays present in the direction corresponding to the gaze of the occupant detected by the detector, the display controller displays the image of the surroundings on each of the plurality of displays.

3. The vehicle control system according to claim 1, wherein the display is a mobile display.

4. The vehicle control system according to claim 1, further comprising a detector configured to detect a gaze of the occupant of the vehicle;

wherein the display controller displays the image of surroundings of the vehicle on the display present in a direction corresponding to the gaze of the occupant of the vehicle detected by the detector.

5. The vehicle control system according to claim 4, wherein, when there is a plurality of the displays present in the direction corresponding to the gaze of the occupant detected by the detector, the display controller displays the image of the surroundings on each of the plurality of displays.

6. The vehicle control system according to claim 1, further comprising an automated driving controller configured to execute automated driving in which at least one of speed control and steering control of the vehicle is performed automatically based on the monitoring result of the monitoring by the surroundings monitoring controller;

wherein the display controller displays, on the display, information indicating conditions surrounding the vehicle in accordance with the monitoring result of the monitoring by the surroundings monitoring controller while the automated driving is being executed by the automated driving controller.

7. A vehicle control method executed by an on-board computer, the method comprising:

capturing an image of surroundings of a vehicle by an imaging device;

monitoring conditions surrounding the vehicle;

displaying, on a display present within a cabin of the vehicle and configured to display an image based on an operation by an occupant, the image of surroundings of the vehicle superimposed over part of the image based on the operation by the occupant; and enlarging the image of the surroundings of the vehicle in accordance with a monitoring result of the conditions surrounding the vehicle, wherein the image based on the operation by the occupant is different from the image of surroundings of the vehicle and the image based on the operation by the occupant does not include the image of surroundings of the vehicle.

8. A vehicle control method executed by an on-board computer, the method comprising:

(i) capturing an image of surroundings of a vehicle by an imaging device;

(ii) monitoring conditions surrounding the vehicle;

(iii) displaying, by using a display configured to display an image overlaid onto a mirror provided to the vehicle, the image of surroundings of the vehicle in accordance with a monitoring result of the conditions surrounding the vehicle; and (iv) detecting a gaze of the occupant of the vehicle, wherein the step (iii) displays the image of surroundings of the vehicle on the display present in a direction corresponding to the detected gaze of the occupant of the vehicle, and wherein, when there is a plurality of the displays present in the direction corresponding to the detected gaze of the occupant, the step (iii) displays the image of the surroundings on each of the plurality of displays.

9. A non-transitory computer readable medium storing a vehicle control program for causing an on-board computer to execute processing, the processing comprising:

processing to capture an image of surroundings of a vehicle by an imaging device;

processing to monitor conditions surrounding the vehicle; and processing to display, on a display present within a cabin of the vehicle and configured to display an image based on an operation by an occupant, the image of surroundings of the vehicle superimposed over part of the image based on the operation by the occupant, and to enlarge the image of the surroundings of the vehicle in accordance with a monitoring result of the conditions surrounding the vehicle, wherein the image based on the operation by the occupant is different from the image of surroundings of the vehicle and the image based on the operation by the occupant does not include the image of surroundings of the vehicle.

10. A non-transitory computer readable medium storing a vehicle control program for causing an on-board computer to execute processing, the processing comprising:

(i) processing to capture an image of surroundings of a vehicle by an imaging device;

(ii) processing to monitor conditions surrounding the vehicle;

(iii) processing to display, by using a display configured to display an image overlaid onto a mirror provided to the vehicle, the image of surroundings of the vehicle in accordance with a monitoring result of the conditions surrounding the vehicle; and (iv) detecting a gaze of the occupant of the vehicle, wherein the step (iii) displays the image of surroundings of the vehicle on the display present in a direction corresponding to the detected gaze of the occupant of the vehicle, and wherein, when there is a plurality of the displays present in the direction corresponding to the detected gaze of the occupant, the step (iii) displays the image of the surroundings on each of the plurality of displays.

11. The vehicle control system according to claim 1, wherein the image based on the operation by the occupant includes an image content selected by the occupant.

12. The vehicle control system according to claim 6, the automated driving controller executes a driving event provided by an action plan to control the vehicle, and the display controller displays, on the display, conditions surrounding the vehicle in the direction in which the driving event occurs.

* * * * *